US011850113B2

(12) United States Patent
Katzman et al.

(10) Patent No.: US 11,850,113 B2
(45) Date of Patent: Dec. 26, 2023

(54) SYSTEMS AND METHODS FOR CONSTRUCTING A THREE-DIMENSIONAL MODEL FROM TWO-DIMENSIONAL IMAGES

(71) Applicant: SDC U.S. SmilePay SPV, Nashville, TN (US)

(72) Inventors: Jordan Katzman, Nashville, TN (US); Christopher Yancey, Nashville, TN (US); Tim Wucher, Windhoek (NA)

(73) Assignee: SDC U.S. SmilePay SPV, Nashville, TN (US)

( * ) Notice: Subject to any disclaimer, the term of this patent is extended or adjusted under 35 U.S.C. 154(b) by 0 days.

(21) Appl. No.: 17/850,146

(22) Filed: Jun. 27, 2022

(65) Prior Publication Data

US 2022/0327774 A1    Oct. 13, 2022

Related U.S. Application Data

(63) Continuation of application No. 17/247,055, filed on Nov. 25, 2020, now Pat. No. 11,403,813, which is a
(Continued)

(51) Int. Cl.
*A61C 7/00* (2006.01)
*G06T 17/00* (2006.01)
(Continued)

(52) U.S. Cl.
CPC ............ *A61C 7/002* (2013.01); *G06F 18/214* (2023.01); *G06T 7/0012* (2013.01); *G06T 7/70* (2017.01);
(Continued)

(58) Field of Classification Search
None
See application file for complete search history.

(56) References Cited

U.S. PATENT DOCUMENTS

| 5,886,702 A | 3/1999 | Migdal et al. |
| 5,945,996 A | 8/1999 | Migdal et al. |

(Continued)

FOREIGN PATENT DOCUMENTS

| CN | 106504331 | 3/2017 |
| CN | 107862738 A | 3/2018 |

(Continued)

OTHER PUBLICATIONS

Charrier et al., "Comparison of No-Reference Image Quality Assessment Machine Learning-based Algorithms on Compressed Images", Feb. 2015, San Francisco, California, 10 pages.
(Continued)

*Primary Examiner* — Leon Viet Q Nguyen
(74) *Attorney, Agent, or Firm* — Foley & Lardner LLP

(57) ABSTRACT

A system includes one or more processors coupled to a non-transitory memory, where the one or more processors are configured to generate, using a training set comprising one or more two-dimensional (2D) training images of a dental arch and a three-dimensional (3D) dental arch model, a machine-learning model configured to generate 3D models of dental arches from 2D images of the dental arches, receive one or more 2D images of a dental arch of a user obtained by a user device of the user, and execute the machine-learning model using the one or more 2D images as input to generate a 3D model of the dental arch of the user.

30 Claims, 18 Drawing Sheets

Related U.S. Application Data continuation-in-part of application No. 16/696,468, filed on Nov. 26, 2019, now Pat. No. 10,916,053.

(51) Int. Cl.

| | | |
|---|---|---|
| *G06T 7/70* | (2017.01) | |
| *G06T 7/00* | (2017.01) | |
| *G06F 18/214* | (2023.01) | |
| *G06V 10/75* | (2022.01) | |
| *G06V 10/764* | (2022.01) | |
| *G06V 10/774* | (2022.01) | |
| *G06V 10/82* | (2022.01) | |

(52) U.S. Cl.
CPC ............ *G06T 17/00* (2013.01); *G06V 10/751* (2022.01); *G06V 10/764* (2022.01); *G06V 10/774* (2022.01); *G06V 10/82* (2022.01); *G06T 2200/08* (2013.01); *G06T 2200/24* (2013.01); *G06T 2207/20081* (2013.01); *G06T 2207/30036* (2013.01)

(56) References Cited

U.S. PATENT DOCUMENTS

| | | |
|---|---|---|
| 6,208,347 B1 | 3/2001 | Migdal et al. |
| 6,971,873 B2 | 12/2005 | Sachdeva et al. |
| 7,077,647 B2 | 7/2006 | Choi et al. |
| 7,084,868 B2 | 8/2006 | Farag et al. |
| 7,698,014 B2 | 4/2010 | Dunne et al. |
| 7,702,492 B2 | 4/2010 | Marshall |
| 7,831,322 B2 | 11/2010 | Liu et al. |
| 8,113,829 B2 | 2/2012 | Sachdeva et al. |
| 8,152,523 B2 | 4/2012 | Sporbert et al. |
| 8,234,000 B2 | 7/2012 | Andersson et al. |
| 8,417,366 B2 | 4/2013 | Getto et al. |
| 8,478,698 B1 | 7/2013 | Mah |
| 8,896,592 B2 | 11/2014 | Boltunov et al. |
| 8,995,732 B2 | 3/2015 | Kaza et al. |
| 9,299,192 B2 | 3/2016 | Kopelman |
| 9,301,814 B2 | 4/2016 | Kaza et al. |
| 9,566,132 B2 | 2/2017 | Stone-Collonge et al. |
| 9,626,462 B2 | 4/2017 | Somasundaram et al. |
| 9,684,952 B2 | 6/2017 | Carlson et al. |
| 9,770,217 B2 | 9/2017 | Sandholm et al. |
| 9,829,710 B1 | 11/2017 | Newell et al. |
| 9,838,670 B2 | 12/2017 | Glinec et al. |
| 9,839,494 B2 | 12/2017 | Kaza et al. |
| 10,074,178 B2 | 9/2018 | Cocco et al. |
| 10,109,114 B1 | 10/2018 | Yancey et al. |
| 10,143,537 B2 | 12/2018 | Kaza et al. |
| 10,162,908 B1 | 12/2018 | Bhaskara et al. |
| 10,248,883 B2 | 4/2019 | Borovinskih et al. |
| 10,335,252 B2 | 7/2019 | Kaza et al. |
| 10,398,539 B2 | 9/2019 | Nilsson |
| 10,405,947 B1 | 9/2019 | Kaza et al. |
| 10,441,395 B2 | 10/2019 | Mah |
| 10,485,638 B2 | 11/2019 | Salah et al. |
| 10,485,639 B2 | 11/2019 | Levin |
| 10,517,696 B2 | 12/2019 | Kitching et al. |
| 10,624,716 B2 | 4/2020 | Kitching et al. |
| 10,977,818 B2 | 4/2021 | Clark et al. |
| 11,043,026 B1 | 6/2021 | Fathi et al. |
| 2002/0028418 A1 | 3/2002 | Farag et al. |
| 2006/0040236 A1 | 2/2006 | Schmitt |
| 2006/0127855 A1 | 6/2006 | Wen |
| 2006/0204078 A1 | 9/2006 | Orth et al. |
| 2006/0263738 A1 | 11/2006 | Kuo |
| 2006/0275736 A1 | 12/2006 | Wen et al. |
| 2007/0207437 A1 | 9/2007 | Sachdeva et al. |
| 2008/0206705 A1 | 8/2008 | Kaza et al. |
| 2009/0148816 A1 | 6/2009 | Marshall et al. |
| 2009/0160855 A1 | 6/2009 | Wu |
| 2009/0220134 A1 | 9/2009 | Cahill et al. |
| 2009/0316966 A1 | 12/2009 | Marshall et al. |
| 2010/0324875 A1 | 12/2010 | Kalili |
| 2011/0196653 A1 | 8/2011 | Lajoie et al. |
| 2011/0200248 A1 | 8/2011 | Matabosch I Gerones et al. |
| 2012/0015316 A1 | 1/2012 | Sachdeva et al. |
| 2012/0191421 A1 | 7/2012 | Greenberg |
| 2012/0330447 A1 | 12/2012 | Gerlach et al. |
| 2013/0051516 A1 | 2/2013 | Yang et al. |
| 2013/0218530 A1 | 8/2013 | Deichmann et al. |
| 2014/0026419 A1 | 1/2014 | Haber |
| 2014/0037194 A1 | 2/2014 | Kitamura et al. |
| 2014/0051037 A1 | 2/2014 | Fisker |
| 2014/0203463 A1 | 7/2014 | Haber |
| 2014/0254919 A1 | 9/2014 | Sun et al. |
| 2015/0182316 A1 | 7/2015 | Morales et al. |
| 2015/0199839 A1 | 7/2015 | Chon |
| 2015/0264299 A1 | 9/2015 | Leech et al. |
| 2015/0348320 A1 | 12/2015 | Pesach et al. |
| 2016/0125651 A1 | 5/2016 | Lior et al. |
| 2016/0148375 A1 | 5/2016 | Oh et al. |
| 2016/0175068 A1 | 6/2016 | Cai et al. |
| 2016/0210602 A1 | 7/2016 | Siddique et al. |
| 2016/0220173 A1 | 8/2016 | Ribnick et al. |
| 2016/0220200 A1 | 8/2016 | Sandholm et al. |
| 2016/0228212 A1 | 8/2016 | Salah et al. |
| 2016/0324597 A1 | 11/2016 | Colby |
| 2017/0061588 A1 | 3/2017 | Lee et al. |
| 2017/0085863 A1 | 3/2017 | Lopez et al. |
| 2017/0161640 A1 | 6/2017 | Shamir |
| 2017/0304950 A1 | 10/2017 | Moore |
| 2017/0312060 A1 | 11/2017 | Morales et al. |
| 2017/0340390 A1 | 11/2017 | Harbison et al. |
| 2017/0345147 A1 | 11/2017 | Ohtake et al. |
| 2018/0025496 A1 | 1/2018 | Lindner et al. |
| 2018/0028294 A1 | 2/2018 | Azernikov et al. |
| 2018/0085201 A1 | 3/2018 | Wu et al. |
| 2018/0091169 A1 | 3/2018 | Colby |
| 2018/0168780 A1* | 6/2018 | Kopelman .............. G16H 30/20 |
| 2018/0168781 A1 | 6/2018 | Kopelman et al. |
| 2018/0206940 A1 | 7/2018 | Kopelman et al. |
| 2018/0263731 A1 | 9/2018 | Pokotilov et al. |
| 2018/0263732 A1 | 9/2018 | Pokotilov et al. |
| 2018/0303581 A1* | 10/2018 | Martz .................. A61C 9/0006 |
| 2018/0344430 A1 | 12/2018 | Salah et al. |
| 2018/0350134 A1 | 12/2018 | Lodato et al. |
| 2018/0352150 A1 | 12/2018 | Purwar et al. |
| 2018/0368943 A1 | 12/2018 | Katzman et al. |
| 2019/0026598 A1 | 1/2019 | Salah et al. |
| 2019/0026599 A1 | 1/2019 | Salah et al. |
| 2019/0026942 A1 | 1/2019 | Zhang |
| 2019/0090982 A1 | 3/2019 | Kuo |
| 2019/0090984 A1 | 3/2019 | Martz et al. |
| 2019/0125493 A1 | 5/2019 | Salah et al. |
| 2019/0139300 A1 | 5/2019 | Kirchberg et al. |
| 2019/0148005 A1* | 5/2019 | Domracheva .......... G16H 20/40 345/424 |
| 2019/0164353 A1 | 5/2019 | Yancey et al. |
| 2019/0175303 A1 | 6/2019 | Akopov et al. |
| 2019/0246000 A1 | 8/2019 | Cheng et al. |
| 2019/0269483 A1 | 9/2019 | Kaza et al. |
| 2019/0282344 A1 | 9/2019 | Azernikov et al. |
| 2019/0295223 A1 | 9/2019 | Shen et al. |
| 2019/0313963 A1 | 10/2019 | Hillen |
| 2019/0332875 A1 | 10/2019 | Vallespi-Gonzalez et al. |
| 2019/0333622 A1 | 10/2019 | Levin et al. |
| 2019/0388188 A1 | 12/2019 | Kaza et al. |
| 2020/0000552 A1* | 1/2020 | Mednikov ................ A61C 5/20 |
| 2020/0031934 A1 | 1/2020 | Gu et al. |
| 2020/0100871 A1 | 4/2020 | Wang et al. |
| 2020/0311934 A1 | 10/2020 | Cherkas et al. |
| 2020/0404243 A1 | 12/2020 | Saphier et al. |
| 2020/0405464 A1 | 12/2020 | Nikolskiy et al. |
| 2021/0117308 A1 | 4/2021 | Burgos |
| 2021/0141986 A1 | 5/2021 | Ganille et al. |
| 2021/0153986 A1 | 5/2021 | Wirjadi et al. |
| 2021/0166445 A1 | 6/2021 | Wang et al. |
| 2021/0174604 A1 | 6/2021 | Long et al. |

(56) References Cited

U.S. PATENT DOCUMENTS

2021/0186659 A1 6/2021 Li et al.
2022/0110723 A1 4/2022 Raby

FOREIGN PATENT DOCUMENTS

| EP | 3 462 373 | 4/2019 |
|----|-----------|--------|
| EP | 3 620 130 | 3/2020 |
| WO | WO-2019/002631 A1 | 1/2019 |

OTHER PUBLICATIONS

Chen et al., "Learning to Predict 3D Objects with an Interpolation-based Differentiable Renderer", https://arxiv.org/pdf/1908.01210.pdf, Nov. 21, 2019, 11 Pages.
Fan et al., "A Point Set Generation Network for 3D Object Reconstruction From a Single Image", Stanford University, Dec. 7, 2016, 12 pages.
Gregor et al., "DRAW: A Recurrent Neural Network for Image Generation", Google DeepMind, May 20, 2015, 10 pages.
Hochreiter et al., "Long Short-Term Memory", Neural Computation: 9(8), Dec. 1997, 33 pages.
Howard et al., "MobileNets: Efficient Convolutional Neural Networks for Mobile Vision Applications", Apr. 17, 2017, 9 pages.
International Search Report and Written Opinion for International Application No. PCT/US2018/062824, dated Jan. 2, 2019, 8 pages.
International Search Report and Written Opinion for International Application No. PCT/US2020/014989, dated May 13, 2020, 12 pages.
International Search Report and Written Opinion on International Application No. PCT/US2020/070820, dated Mar. 12, 2021, 12 pages.
International Search Report and Written Opinion on International Application No. PCT/US2021/061997, dated Mar. 8, 2022, 15 pages.
Kurenkov et al., "DeformNet: Free-Form Deformation Network for 3D Shape Reconstruction from a Single Image", Stanford Vision and Learning Lab, Aug. 11, 2017, 12 pages.
Li et al., "Point Cloud GAN", Carnegie Mellon University, Oct. 13, 2018, 19 pages.
Murtagh, Fionn, "Multilayer perceptrons for classification and regression", Jul. 1991, pp. 183-197.
Qi et al., "PointNet: Deep Hierarchical Feature Learning on Point Sets in a Metric Space", Stanford University, Jun. 7, 2017, 14 pages.
Rankred, "15 Tools to Instantly Convert 2d Images to 3d Ones", Jan. 1, 2020, http://www.rankred.com/convert-2d-images-to-3d, 23 pages.
Russakovsky et al., "ImageNet Large Scale Visual Recognition Challenge" Jan. 30, 2015, 43 pages.
Tatarchenko et al., "Octree Generating Networks: Efficient Convolutional Architectures for High-resolution 3D Outputs", University of Freiburg, Intel Labs, Aug. 7, 2017, 15 pages.
Wang et al., "MVPNet: Multi-View Point Regression Networks for 3D Object Reconstruction from a Single Image", Nov. 23, 2018, 8 pages.
Georgia Gkioxari et al., Mesh R-CNN, Facebook AI Research (FAIR), Jun. 6, 2019, 15 Pages.

* cited by examiner

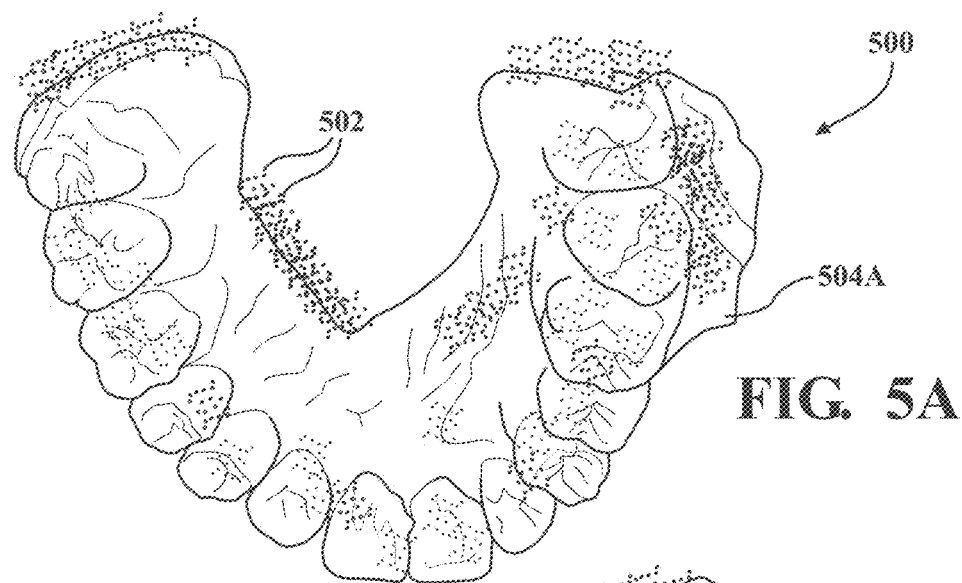
FIG. 5A
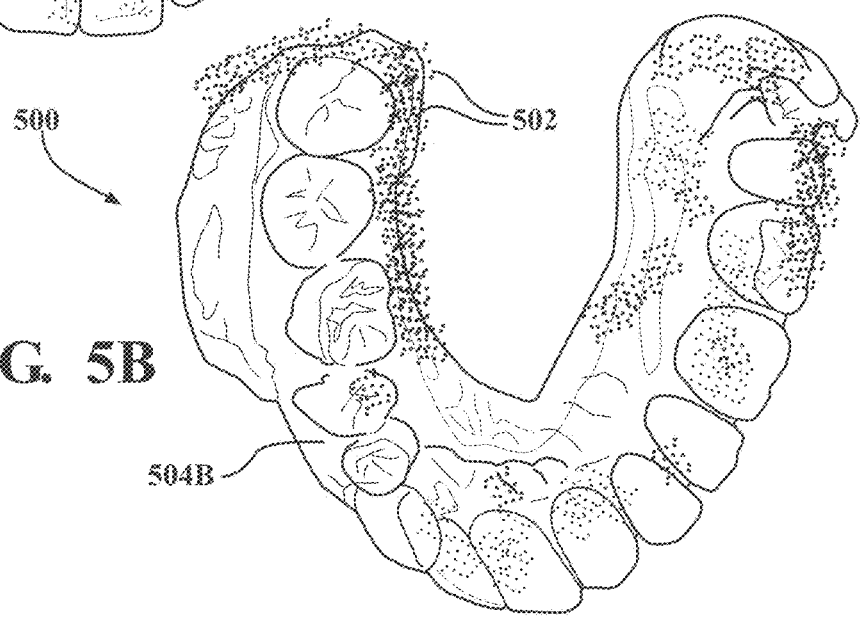
FIG. 5B
FIG. 5C
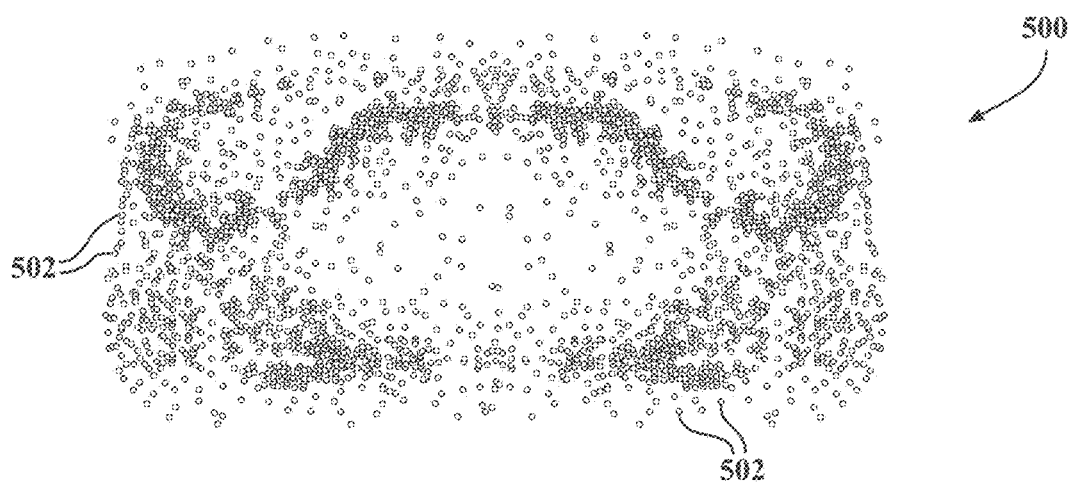

SYSTEMS AND METHODS FOR CONSTRUCTING A THREE-DIMENSIONAL MODEL FROM TWO-DIMENSIONAL IMAGES

CROSS-REFERENCE TO RELATED APPLICATIONS

This application is a continuation of U.S. patent application Ser. No. 17/247,055, filed Nov. 25, 2020, which is a continuation-in-part of U.S. patent application Ser. No. 16/696,468, filed Nov. 26, 2019, now U.S. Pat. No. 10,916, 053, the contents of each of which are hereby incorporated by reference in their entirety.

BACKGROUND

The present disclosure relates generally to constructing three-dimensional models for use in manufacturing dental appliances. More specifically, the present disclosure relates to constructing three-dimensional models of a user's dental arch from two-dimensional images of the user's dental arch to manufacture dental aligners.

Dental aligners for repositioning a user's teeth may be manufactured for the user based on a 3D model of the user's teeth. The 3D model can be generated from a dental impression or an intraoral scan of the user's teeth. Dental impressions for generating such a 3D model can be taken by a user or an orthodontic professional using a dental impression kit. An intraoral scan of the user's mouth can be taken using 3D scanning equipment. However, these methodologies for obtaining information necessary to generate a 3D model of the user's teeth can be time consuming, prone to errors made by the user or orthodontic professional, and require specialized equipment.

SUMMARY

An embodiment relates to a system. The system includes a model training system and a model generation system. The model training system is configured to receive a plurality of data packets of a training set. Each data packet of the plurality of data packets includes data corresponding to one or more training images of a respective dental arch and a three-dimensional (3D) training model of the respective dental arch. The model training system is configured to identify, for each data packet of the plurality of data packets of the training set, a plurality of correlation points between the one or more training images and the 3D training model of the respective dental arch. The model training system is configured to generate a machine learning model using the one or more training images, the 3D training model, and the plurality of correlation points between the one or more training images and the 3D training model of each correlation point the plurality of data packets of the training set. The model generation system is configured to receive one or more images of a dental arch of a user. The model generation system is configured to generate a 3D model of the dental arch of the user by applying the one or more images of the dental arch to the machine learning model.

Another embodiment relates to a method. The method includes receiving, by a model training system, a plurality of data packets of a training set. Each data packet of the plurality of data packets includes data corresponding to one or more training images of a respective dental arch and a three-dimensional (3D) training model of the respective dental arch. The method includes identifying, by the model training system, for each data packet of the plurality of data packets of the training set, a plurality of correlation points between the one or more training images and the 3D training model of the respective dental arch. The method includes generating, by the model training system, a machine learning model using the one or more training images, the 3D training model, and the plurality of correlation points between the one or more training images and the 3D training model of each of the plurality of data packets of the training set. The method includes receiving, by a model generation system, one or more images of a dental arch of a user. The method includes generating, by the model generation system, a 3D model of the dental arch of the user by applying the one or more images of the dental arch to the machine learning model.

Another embodiment relates to a non-transitory computer readable medium storing instructions which, when executed by one or more processors, cause the one or more processors to receive a plurality of data packets of a training set. Each data packet of the plurality of data packets includes data corresponding to one or more training images of a respective dental arch and a three-dimensional (3D) training model of the respective dental arch. The instructions further cause the one or more processors to identify, for each data packet of the plurality of data packets of the training set, a plurality of correlation points between the one or more training images and the 3D training model of the respective dental arch. The instructions further cause the one or more processors to generate a machine learning model using the one or more training images, the 3D training model, and the plurality of correlation points between the one or more training images and the 3D training model of each of the plurality of data packets of the training set. The instructions further cause the one or more processors to receive one or more images of a dental arch of a user. The instructions further cause the one or more processors generate a 3D model of the dental arch of the user by applying the one or more images of the dental arch to the machine learning model.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 5A is an illustration of an example point cloud overlaid on a digital model of upper dental arch, according to an illustrative embodiment.

FIG. 5B is an illustration of an example point cloud overlaid on a digital model of a lower dental arch, according to an illustrative embodiment.

FIG. 5C is an illustration of a point cloud including the point clouds shown in FIG. 5A and FIG. 5B, according to an illustrative embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, described herein are systems and methods for generating a three-dimensional (3D) model of a user's dental arch from two-dimensional (2D) images. A model generation system receives images of the user's dental arch, generates a point cloud using the images of the user's dental arch, and manufactures dental aligner(s) based on the point cloud. The systems and methods described herein have many advantages over other implementations. For instance, the systems and methods described herein expedite the manufacturing and delivery of dental aligners to a user by more efficiently generating 3D models of the user's dentition without requiring the user to administer a dental impression kit, conduct a scan of their dentition, or attend an appointment with a dentist or orthodontist. By not requiring an appointment with a dentist or orthodontist, such systems and methods may make users more comfortable and confident with receiving orthodontic treatment, and avoid delays in receiving orthodontic treatment due to needing to retake dental impressions or a scan of the user's teeth. If an additional 2D image of the user's dentition is needed, such images can easily be acquired by taking an additional photograph of the user's dentition, whereas a user undergoing a more traditional orthodontic treatment would be required to obtain an impression kit or visit a dentist or orthodontist to have an additional scan of their dentition conducted. Instead of requiring the user to administer dental impressions or visit an intraoral scanning site for receiving an intraoral scan of the user's dentition, the systems and methods described herein leverage images captured by the user to manufacture dental aligners. As another example, the systems and methods described herein may be used to manufacture dental aligners by supplementing data regarding the user's dentition, for example, acquired by an intraoral scan, or a dental impression administered by the user.

Figure 1:
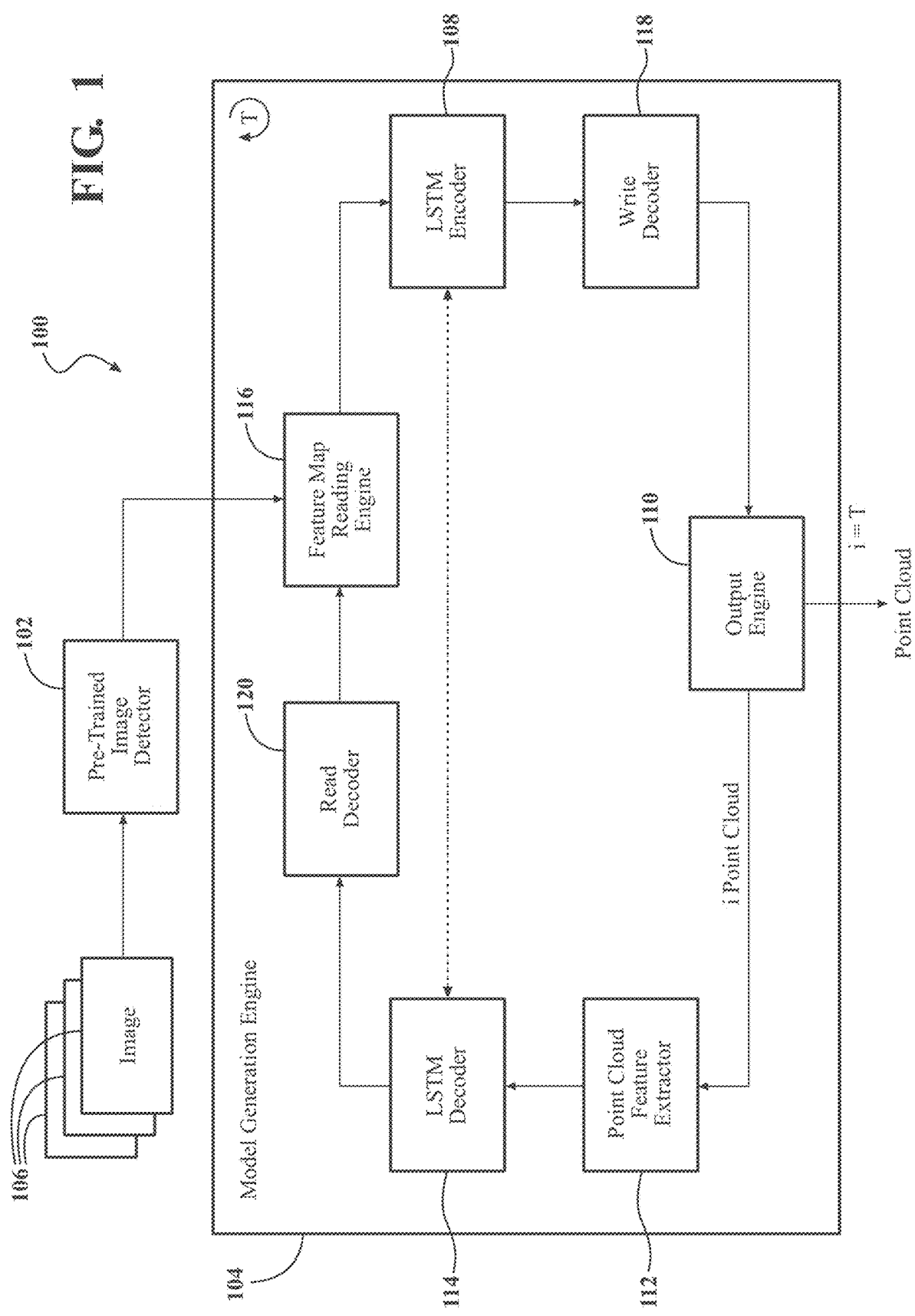
FIG. 1 is a block diagram of a system for generating a three-dimensional (3D) model from one or more two-dimensional (2D) images, according to an illustrative embodiment.

Referring now to FIG. 1, a system 100 for generating a three dimensional (3D) model is shown according to an illustrative embodiment. The system 100 (also referred to herein as a model generation system 100) is shown to include a pre-trained image detector 102 and a model generation engine 104. As described in greater detail below, the pre-trained image detector 102 is configured to generate an image feature map from one or more images 106 of a mouth of a user. The model generation engine 104 is configured to generate a 3D model using the one or more images 106. The model generation engine 104 includes a long short-term memory (LSTM) encoder 108 configured to compute a probability of each feature of the image feature map using one or more weights. The model generation engine 104 includes an output engine 110 configured to generate a point cloud using data from the LSTM encoder 108. The model generation engine 104 includes a point cloud feature extractor 112 configured to determine features from the point cloud generated by the output engine 110. The model generation engine 104 includes an LSTM decoder 114 configured to determine a difference between features from the point cloud and corresponding probabilities of features of the image feature map. The LSTM encoder 108 trains the one or more weights for computing the probability based on the difference determined by the LSTM decoder 114. The model generation engine 104 iteratively cycles between the LSTM encoder 108, output engine 110, point cloud feature extractor 112, and LSTM decoder 114 to generate and refine point clouds corresponding to the images 106. At the final iteration, an output engine 110 is configured to generate the 3D model using the final iteration of the point cloud.

The model generation system 100 is shown to include a pre-trained image detector 102. The pre-trained image detector 102 may be any device(s), component(s), application(s), element(s), script(s), circuit(s), or other combination of software and/or hardware designed or implemented to generate an image feature map from one or more images 106. The pre-trained image detector 102 may be embodied on a server or computing device, embodied on a mobile device communicably coupled to a server, and so forth. In some implementations, the pre-trained image detector 102 may be embodied on a server which is designed or implemented to generate a 3D model using two dimensional (2D) images. The server may be communicably coupled to a mobile device (e.g., via various network connections).

Figure 2A:
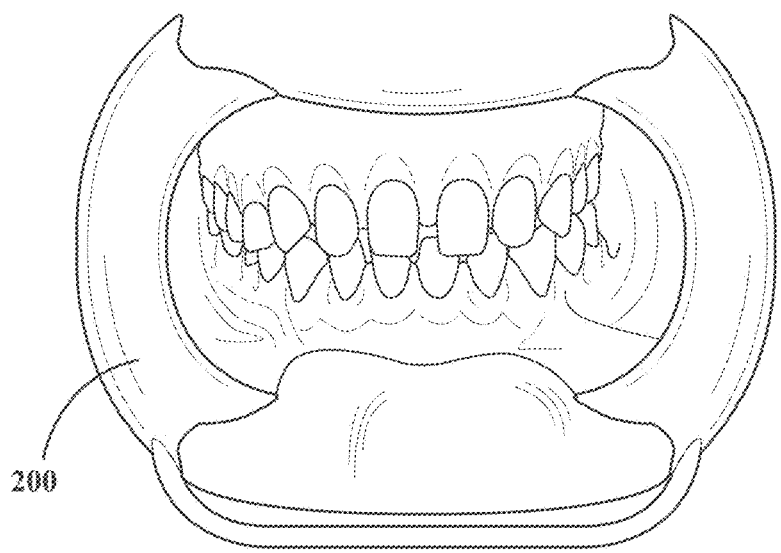
FIG. 2A is an illustration of a first example image of a patient's mouth, according to an illustrative embodiment.
Figure 2B:
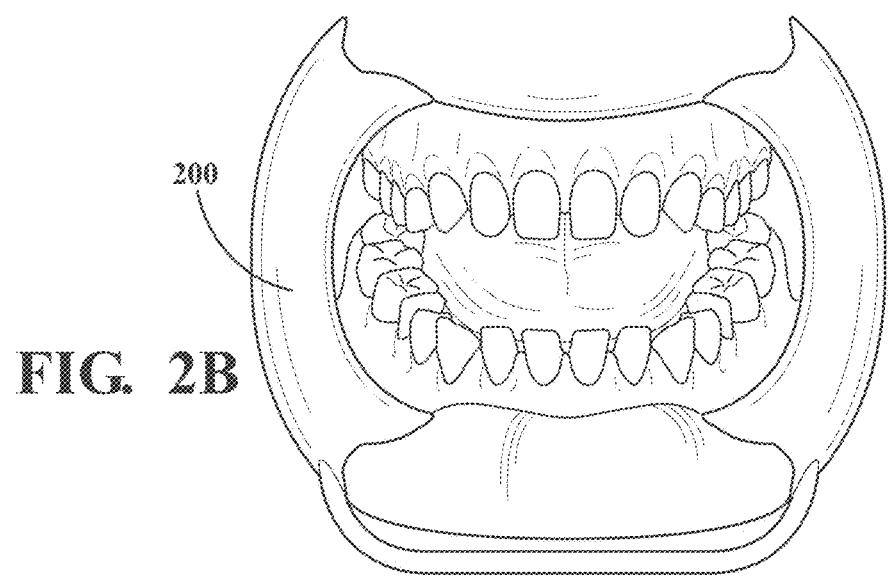
FIG. 2B is an illustration of a second example image of a patient's mouth, according to an illustrative embodiment.
Figure 2C:
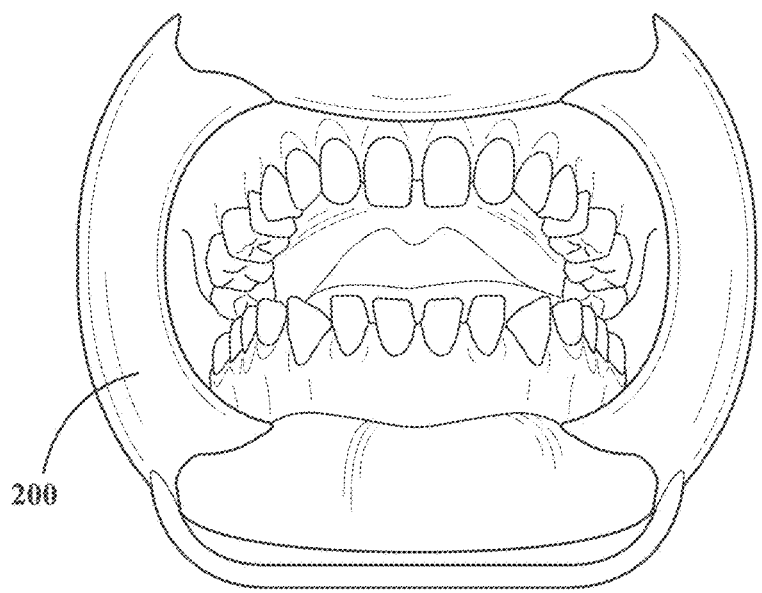
FIG. 2C is an illustration of a third example image of a patient's mouth, according to an illustrative embodiment.

Referring now to FIG. 1 and FIG. 2A-FIG. 2C, the pre-trained image detector 102 may be configured to receive one or more images 106 of a mouth of a user, such as one or more 2D images. Specifically, FIG. 2A-FIG. 2C are illustrations of example images 106 of a user's mouth. The user may capture a first image 106 of a straight on, closed view of the user's mouth by aiming a camera in a straight-on manner perpendicular to the labial surface of the teeth (shown in FIG. 2A), a second image 106 of a lower, open view of the user's mouth by aiming a camera from an upper angle down toward the lower teeth (shown in FIG. 2B), and a third image 106 of an upper, open view of the user's mouth by aiming a camera from a lower angle up toward the upper teeth (shown in FIG. 2C). The user may capture images 106 with a dental appliance 200 positioned at least partially within the user's mouth. The dental appliance 200 is configured to hold open the user's lips to expose the user's teeth and gingiva. The user may capture various image(s) 106 of the user's mouth (e.g., with the dental appliance 200 positioned therein). In some embodiments, the user takes two images of their teeth from substantially the same viewpoint (e.g., both from a straight-on viewpoint), or from substantially the same viewpoint but offset slightly. After capturing the images 106, the user may upload the images 106 to the pre-trained image detector 102 (e.g., to a website or internet-based portal associated with the pre-trained image detector 102 or model generation system 100, by emailing or sending a message of the images 106 to an email address or phone number or other account associated with the pre-trained image detector 102, and so forth).

The pre-trained image detector 102 is configured to receive the images 106 from the mobile device of the user. The pre-trained image detector 102 may receive the images 106 directly from the mobile device (e.g., by the mobile device transmitting the images 106 via a network connection to a server which hosts the pre-trained image detector 102). The pre-trained image detector 102 may retrieve the images 106 from a storage device (e.g., where the mobile device stored the images 106 on the storage device, such as a database or a cloud storage system). In some embodiments, the pre-trained image detector 102 is configured to score the images 106. The pre-trained image detector 102 may generate a metric which identifies the overall quality of the image. The pre-trained image detector 102 may include a Blind/Referenceless Image Spatial Quality Evaluator (BRISQUE). The BRISQUE is configured to generate an image score between a range (e.g., between 0-100, for instance, with lower scores being generated for images having higher quality). The BRISQUE may be configured to generate the image score based on, for example, the measured pixel noise, image distortion, and so forth, to objectively evaluate the image quality. Where the image score does not satisfy a threshold, the pre-trained image detector 102 may be configured to generate a prompt for the user which directs the user to re-take one or more of the images 106.

Figure 3:
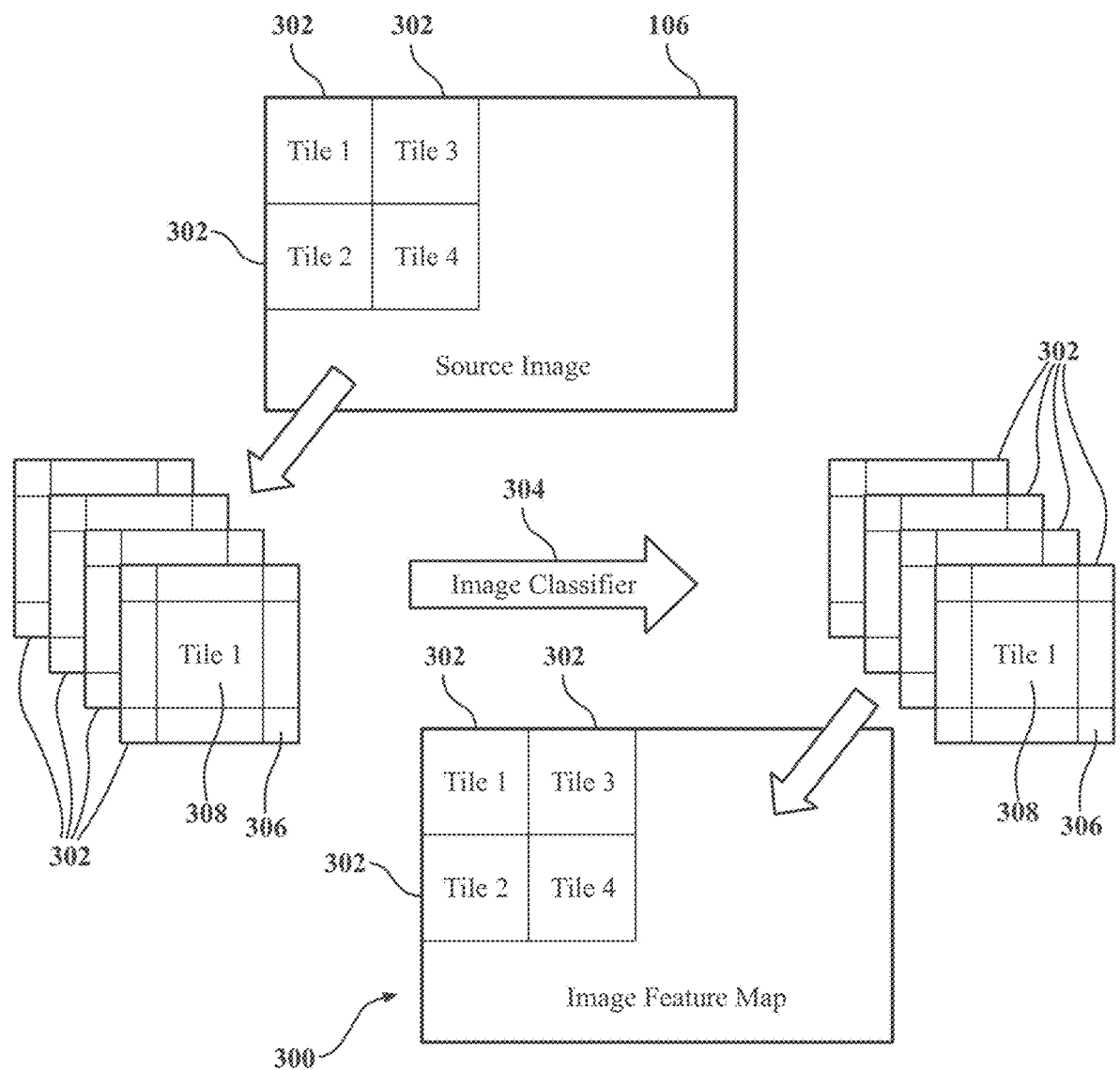
FIG. 3 is a block diagram of an image feature map generated by the system of FIG. 1, according to an illustrative embodiment.

Referring now to FIG. 1 and FIG. 3, the pre-trained image detector 102 is configured to process the image(s) 106 to generate an image feature map 300. Specifically, FIG. 3 is a block diagram of an image feature map 300 corresponding to one of the image(s) 106 received by the pre-trained image detector 102. The pre-trained image detector 102 may be configured to process images 106 received from the mobile device of the user to generate the image feature map 300. In some implementations, the pre-trained image detector 102 is configured to break down, parse, or otherwise segment the images 106 into a plurality of portions. In some implementations, the pre-trained image detector 102 is configured to segment the images 106 into a plurality of tiles 302. Each tile 302 corresponds to a particular portion, section, or region of a respective image 106. In some instances, the tiles 302 may have a predetermined size or resolution. For instance, the tiles 302 may have a resolution of 512 pixels×512 pixels (though the tiles 302 may have different sizes or resolutions). The tiles 302 may each be the same size, or some tiles 302 may have a different size than other tiles 302. In some embodiments, the tiles 302 may include a main portion 306 (e.g., located at or towards the middle of the tile 302) and an overlapping portion 308 (e.g., located along the perimeter of the tile 302). The main portion 306 of each tile 302 may be unique to each respective tile 302. The overlapping portion 308 may be a common portion shared with one or more neighboring tiles 302. The overlapping portion 308 may be used by the pre-trained image detector 102 for context in extracting features (e.g., tooth size, tooth shape, tooth location, tooth orientation, crown size, crown shape, gingiva location, gingiva shape or contours, tooth-to-gingiva interface location, interproximal region location, and so forth) from the main portion of the tile 302.

The pre-trained image detector 102 is configured to determine, identify, or otherwise extract one or more features from the tiles 302. In some implementations, the pre-trained image detector 102 includes an image classifier neural network 304 (also referred to herein as an image classifier 304). The image classifier 304 may be implemented using a neural network similar to the neural network 400 shown in FIG. 4 and subsequently described. For instance, the image classifier 304 may include an input layer (e.g., configured to receive the tiles 302), one or more hidden layers including various pre-trained weights (e.g., corresponding to probabilities of particular classifications for tiles 302), and an output layer. Each of these layers are described below. The image classifier neural network 304 of the pre-trained image detector 102 is configured to classify each of the tiles 302. The pre-trained image detector 102 may be implemented using various architectures, libraries, or other combination of software and hardware, such as the Mobile-Net architecture, though other architectures may be used (e.g., based on balances between memory requirements, processing speeds, and performance). The pre-trained image detector 102 is configured to process each of the tiles 302 (e.g., piecewise) and stitch together the tiles 302 to generate the image feature map 300. Each classification for a respective tile 302 may correspond to an associated feature within the tile 302. Various examples of classifications include, for instance, a classification of a tooth (e.g., incisors or centrals, canines, premolars or bicuspids, molars, etc.) included in a tile 302, a portion of the tooth included in the tile 302 (e.g., crown, root), whether the gingiva is included in the tile 302, etc. Such classifications may each include corresponding features which are likely to be present in the tile. For instance, if a tile 302 includes a portion of a tooth and a portion of the gingiva, the tile 302 likely includes a tooth-to-gingiva interface. As another example, if a tile 302 includes a molar which shows the crown, the tile 302 likely includes a crown shape, crown size, etc.

In some implementations, the pre-trained image detector 102 is configured to classify each of the tiles 302. For instance, the output from the image classifier 304 may be a classification (or probability of a classification) of the corresponding tile 302 (e.g., provided as an input to the image classifier 304). In such implementations, the image feature map 300 may include each of the tiles 302 with their corresponding classifications. The pre-trained image detector 102 is configured to construct the image feature map 300 by stitching together each of the tiles 302 with each tile 302 including their respective classification. In this regard, the pre-trained image detector 102 is configured to re-construct the images 106 by stitching together the tiles 302 to form the image feature map 300, with the image feature map 300 including the tiles 302 and corresponding classifications. The pre-trained image detector 102 is configured to provide the image feature map 300 as an input to a model generation engine 104. In some implementations, the image feature map 300 generated by the pre-trained image detector 102 may be a compressed filed (e.g., zipped or other format). The pre-trained image detector 102 may be configured to format the image feature map 300 into a compressed file for transmission to the model generation engine 104. The model generation engine 104 may be configured to parse the image feature map 300 for generating a point cloud corresponding to the image(s) 106, as described in greater detail below.

The model generation system 100 is shown to include a model generation engine 104. The model generation engine 104 may be any device(s), component(s), application(s), element(s), script(s), circuit(s), or other combination of software and/or hardware designed or implemented to generate a three-dimensional (3D) model of a user's dental arch from one or more images 106 of the user's dentition. The model generation engine 104 is configured to generate the 3D model using a plurality of images 106 received by the pre-trained image detector 102 (e.g., from a mobile device of the user). The model generation engine 104 may include a processing circuit including one or more processors and memory. The memory may store various instructions, routines, or other programs that, when executed by the processor(s), cause the processor(s) to perform various tasks relating to the generation of a 3D model. In some implementations, various subsets of processor(s), memory, instructions, routines, libraries, etc., may form an engine. Each engine may be dedicated to performing particular tasks associated with the generation of a 3D model. Some engines may be combined with other engines. Additionally, some engines may be segmented into a plurality of engines.

The model generation engine 104 is shown to include a feature map reading engine 116. The feature map reading engine 116 may be any device(s), component(s), application(s), element(s), script(s), circuit(s), or other combination of software and/or hardware designed or implemented to read features from an image feature map 300. The feature map reading engine 116 may be designed or implemented to format, re-format, or modify the image feature map 300 received from the pre-trained image detector 102 for use by other components of the model generation engine 104. For instance, where the output from the pre-trained image detector 102 is a compressed file of the image feature map 300, the feature map reading engine 116 is configured to decompress the file such that the image feature map 300 may be used by other components or elements of the model generation engine 104. In this regard, the feature map reading engine 116 is configured to parse the output received from the pre-trained image detector 102. The feature map reading engine 116 may parse the output to identify the tiles 302, the classifications of the tiles 302, features corresponding to the classifications of the tiles 302, etc. The feature map reading engine 116 is configured to provide the image feature map 300 as an input to an LSTM encoder 108, as described in greater detail below.

Figure 4:
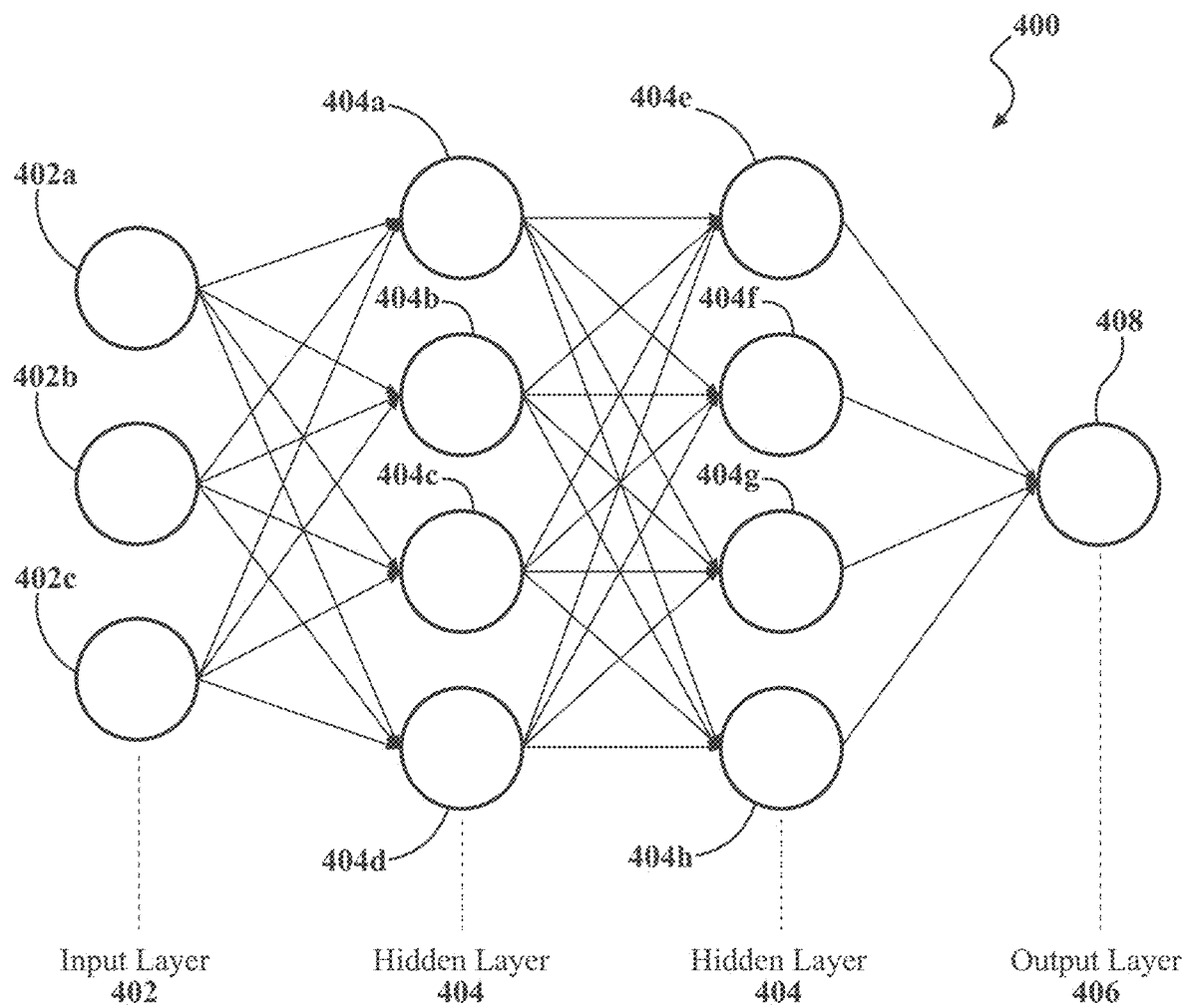
FIG. 4 is a block diagram of a neural network which may be implemented within one or more of the components of FIG. 1, according to an illustrative embodiment.

Referring now to FIG. 1 and FIG. 4, the model generation engine 104 is shown to include an LSTM encoder 108 and LSTM decoder 114. Specifically, FIG. 4 is a block diagram of an implementation of a neural network 400 which may implement various components, features, or aspects within the LSTM encoder 108 and/or LSTM decoder 114. The LSTM encoder 108 may be any device(s), component(s), application(s), element(s), script(s), circuit(s), or other combination of software and/or hardware designed or implemented to compute a probability for each feature of the image feature map 300 using one or more weights. The LSTM decoder 114 may be any device(s), component(s), application(s), element(s), script(s), circuit(s), or other combination of software and/or hardware designed or implemented to determine a difference between features from a point cloud and corresponding probabilities of features of the image feature map 300 (e.g., computed by the LSTM encoder 108). The LSTM encoder 108 and LSTM decoder 114 may be communicably coupled to one another such that the outputs of one may be used as an input of the other. The LSTM encoder 108 and LSTM decoder 114 may function cooperatively to refine point clouds corresponding to the images 106, as described in greater detail below.

As shown in FIG. 4, the neural network 400 includes an input layer 402 including a plurality of input nodes 402a-402c, a plurality of hidden layers 404 including a plurality of perception nodes 404a-404h, and an output layer 406 including an output node 408. The input layer 402 is configured to receive one or more inputs via the input nodes 402a-402c (e.g., the image feature map 300, data from the LSTM decoder 114, etc.). The hidden layer(s) 404 are connected to each of the input nodes 402a-402c of the input layer 402. Each layer of the hidden layer(s) 404 are configured to perform one or more computations based on data received from other nodes. For instance, a first perception node 404a is configured to receive, as an input, data from each of the input nodes 402a-402c, and compute an output by multiplying or otherwise providing weights to the input. As described in greater detail below, the weights may be adjusted at various times to tune the output (e.g., probabilities of certain features being included in the tiles 302). The computed output is then provided to the next hidden layer 404 (e.g., to perception nodes 404e-404h), which then compute a new output based on the output from perception node 404a as well as outputs from perception nodes 404b-404d. In the neural network implemented in the LSTM encoder 108, for instance, the hidden layers 404 may be configured to compute probabilities of certain features in the images 106 of the user's dentition based on the image feature map 300 and data from the LSTM decoder 114, as described in greater detail below. For instance, the hidden layers 404 may be configured to compute probabilities of features, such as tooth size, tooth shape, tooth location, tooth orientation, crown size, crown shape, gingiva location, gingiva shape or contours, tooth-to-gingiva interface location, interproximal region location, and so forth. Together, such features describe, characterize, or otherwise define the user's dentition.

The LSTM encoder 108 is configured to compute a probability of each potential feature being present in the images 106. The LSTM encoder 108 is configured to receive the image feature map 300 (e.g., from the pre-trained image detector 102 directly, or indirectly from the feature map reading engine 116). The LSTM encoder 108 may be or include a neural network (e.g., similar to the neural network 400 depicted in FIG. 4) designed or implemented to compute a probability of the potential features in the images 106 using the image feature map 300. The LSTM encoder 108 may be configured to use data from the LSTM decoder 114 and the image feature map 300 for computing a probability of the features within the images 106. Each feature associated with an image (e.g., of a user's dentition) or a tile 302 for an image 106 may have a corresponding probability. The probability may be a probability or likelihood of a particular feature being present within the image 106 or tile 302 (e.g., a probability of a particular tooth size, tooth orientation, tooth-to-gingiva interface location, etc. within the image 106 or tile 302). For instance, neurons of the neural network may be trained to detect and compute a probability for various potential features described above within an image 106. The neurons may be trained using a training set of images and/or tiles and labels corresponding to particular features, using feedback from a user (e.g., validating outputs from the neural network), etc.

As an example, a lateral incisor may have several possible orientations. A neuron of the LSTM encoder 108 may be trained to compute probabilities of the orientation of the lateral incisor relative to a gingival line. The neuron may detect (e.g., based on features from the image feature map 300) the lateral incisor having an orientation extending 45° from the gingival line along the labial side of the dental arch. The LSTM encoder 108 is configured to compute a probability of the lateral incisor having the orientation extending 45° from the gingival line. As described in greater detail below, during subsequent iterations, the neuron may have weights which are further trained to detect the lateral incisor having an orientation extending 60° from the gingival line along the labial side of the dental arch and compute the probability of the lateral incisor having the orientation extending 60° from the gingival line. Through a plurality of iterations, the probabilities of the orientation of the lateral incisor are adjusted, modified, or otherwise trained based on determined orientations and feedback from the LSTM decoder 114. In this regard, the neurons of the LSTM encoder 108 have weights which are tuned, adjusted, modified, or otherwise trained over time to have both a long term memory (e.g., through training of the 45° orientation in the example above) and short term memory (e.g., through training of the 60° orientation in the example above).

As such, the neurons are trained to detect that a tooth may have multiple possible features (e.g., a tooth may have an orientation of 45° or 60°, or other orientations detected through other iterations). Such implementations and embodiments provide for a more accurate overall 3D model which more closely matches the dentition of the user by providing an LSTM system which is optimized to remember information from previous iterations and incorporate that information as feedback for training the weights of the hidden layer 404 of the neural network, which in turn generates the output (e.g., via the output layer 406), which is used by the output engine 110 for generating the output (e.g., the 3D model). In some implementations, the LSTM encoder 108 and LSTM decoder 114 may be trained with training sets (e.g., sample images). In other implementations, the LSTM encoder 108 and LSTM decoder 114 may be trained with images received from users (e.g., similar to images 106). In either implementation, the LSTM encoder 108 and LSTM decoder 114 may be trained to detect a large set of potential features within images of a user's dental arches (e.g., various orientation, size, etc. of teeth within a user's dentition). Such implementations may provide for a robust LSTM system by which the LSTM encoder 108 can compute probabilities of a given image containing certain features.

Referring back to FIG. 1, the LSTM encoder 108 is configured to generate an output of a plurality of probabilities of each feature based on the input (e.g., the image feature map 300 and inputs from the LSTM decoder 114 described in greater detail below) and weights from the neural network of the LSTM encoder 108. The output layer 406 of the neural network corresponding to the LSTM encoder 108 is configured to output at least some of the probabilities computed by the hidden layer(s) 404. The output layer 406 may be configured to output each of the probabilities, a subset of the probabilities (e.g., the highest probabilities, for instance), etc. The output layer 406 is configured to transmit, send, or otherwise provide the probabilities to a write decoder 118.

The write decoder 118 may be any device(s), component(s), application(s), element(s), script(s), circuit(s), or other combination of software and/or hardware designed or implemented to maintain a list of each of the computed probabilities by the LSTM encoder 108. The write decoder 118 is configured to receive the output from the LSTM encoder 108 (e.g., from the output layer 406 of the neural network corresponding to the LSTM encoder 108). In some implementations, the write decoder 118 maintains the probabilities in a ledger, database, or other data structure (e.g., within or external to the system 100). As probabilities are recomputed by the LSTM encoder 108 during subsequent iterations using updated weights, the write decoder 118 may update the data structure to maintain a list or ledger of the computed probabilities of each feature within the images 106 for each iteration of the process.

The output engine 110 may be any device(s), component(s), application(s), element(s), script(s), circuit(s), or other combination of software and/or hardware designed or implemented to generate a point cloud 500. FIG. 5A-FIG. 5C are illustrations of an example point cloud 500 overlaid on an upper dental arch 504A and a lower dental arch 504B, and a perspective view of the point cloud 500 for the upper and lower dental arch aligned to one another, respectively. The point clouds 500 shown in FIG. 5A-FIG. 5C are generated by the output engine 110. The output engine 110 may be configured to generate the point cloud 500 using the image(s) 106 received by the pre-trained image detector 102. As described in greater detail below, the output engine 110 may be configured to generate a point cloud 500 of a dental arch of the user using probabilities of features within one or more of the images 106. In some instances, the output engine 110 may be configured to generate a point cloud 500 of a dental arch using probabilities of features within one of the images 106. For instance, the output engine 110 may be configured to generate a point cloud 500 of an upper dental arch 504A using an image of an upper open view of the upper dental arch of the user (e.g., such as the image shown in FIG. 2C). In some instances, the output engine 110 may be configured to generate a point cloud 500 of the upper dental arch 504A using two or more images (e.g., the images shown in FIG. 2B and FIG. 2C, the images shown in FIG. 2A-FIG. 2C, or further images). In some instances, the output engine 110 may be configured to generate a point cloud 500 of the lower dental arch 504B using one image (e.g., the image shown in FIG. 2A), a plurality of images (e.g., the images shown in FIG. 2A-FIG. 2B, FIG. 2A-FIG. 2C), etc. The output engine 110 may be configured to combine the point clouds 500 generated for the upper and lower dental arch 504A, 504B to generate a point cloud 500, as shown in FIG. 5C, which corresponds to the mouth of the user. The output engine 110 may use each of the images 106 for aligning the point cloud of the upper and lower dental arch 504A, 504B.

The output engine 110 is configured to generate the point cloud 500 based on data from the LSTM encoder 108 via the write decoder 118. The output engine 110 is configured to parse the probabilities generated by the LSTM encoder 108 to generate points 502 for a point cloud 500 which correspond to features within the images 106. Using the previous example, the LSTM encoder 108 may determine that the highest probability of an orientation of a lateral incisor is 45° from the gingival line along the labial side. The output engine 110 may generate points 502 for the point cloud 500 corresponding to a lateral incisor having an orientation of 45° from the gingival line along the labial side. The output engine 110 is configured to generate points 502 in a 3D space corresponding to features having a highest probability as determined by LSTM encoder 108, where the points 502 are located along an exterior surface of the user's dentition. In some instances, the output engine 110 may generate the points 502 at various locations within a 3D space which align with the highest probability features of the image(s) 106. Each point 502 may be located in 3D space at a location which maps to locations of features in the images. As such, the output engine 110 may be configured to generate points 502 for the point cloud 500 which match the probability of features in the images 106 (e.g., such that the points 502 of the point cloud 500 substantially match a contour of the user's dentition as determined based on the probabilities). The output engine 110 is configured to provide the point cloud 500 to the point cloud feature extractor 112.

The point cloud feature extractor 112 may be any device(s), component(s), application(s), element(s), script(s), circuit(s), or other combination of software and/or hardware designed or implemented to determine one or more features within a point cloud 500. The point cloud feature extractor 112 may be configured to compute, extract, or otherwise determine one or more features from the point cloud 500 to generate an image feature map (e.g., similar to the image feature map received by the LSTM encoder 108). The point cloud feature extractor 112 may leverage one or more external architectures, libraries, or other software for generating the image feature map from the point cloud 500. In some implementations, the point cloud feature extractor 112 may leverage the PointNet architecture to extract feature vectors from the point cloud 500. In this regard, the images 106 are used (e.g., by the pre-trained image detector 102) for generating an image feature map 300, which is used (e.g., by the LSTM encoder 108 and output engine 110) to generate a point cloud 500, which is in turn used (e.g., by the point cloud feature extractor 112) to extract features. The point cloud feature extractor 112 is configured to transmit, send, or otherwise provide the extracted features from the point cloud 500 to the LSTM decoder 114.

The LSTM decoder 114 is configured to receive (e.g., as an input) the extracted features from the point cloud feature extractor 112 and the probabilities of features computed by the LSTM encoder 108. The LSTM decoder 114 is configured to compute, based on the extracted features and the probabilities, a difference between the output from the LSTM encoder 108 and the point cloud 500. In some implementations, the LSTM decoder 114 is configured to compute a loss function using the extracted features from the point cloud 500 and the corresponding probabilities of each feature from the image feature map 300. The LSTM decoder 114 may be configured to determine which features extracted from the point cloud 500 correspond to features within the image feature map 300. The LSTM decoder 114 may determine which features correspond to one another by comparing each feature (e.g., extracted from the point cloud 500 and identified in the image feature map 300) to determine which features most closely match one another. The LSTM decoder 114 may determine which features correspond to one another based on coordinates for points of the point cloud 500 and associated location of tiles 302 in the image feature map 300 (e.g., the coordinates residing within one of the tiles 302, particular regions of the 3D space in which the points correspond to specific tiles 302, and so forth).

Once two features are determined (e.g., by the LSTM decoder 114) to correspond to one another, the LSTM decoder 114 compares the corresponding features to determine differences. For instance, where the feature is determined to be an orientation of a specific tooth, the LSTM decoder 114 is configured to compare the orientation of the feature from the image(s) 106 and the orientation from the point cloud 500. The LSTM decoder 114 is configured to compare the orientations to determine whether the feature represented in the point cloud 500 matches the feature identified in the image(s) 106 (e.g., the same orientation). In some implementations, the LSTM decoder 114 is configured to determine the differences by computing a loss function (e.g., using points 502 from the point cloud 500 and corresponding features from the image feature map 300). The loss function may be a computation of a distance between two points (e.g., a point 502 of the point cloud 500 and corresponding features from the image feature map 300). As the value of the loss function increases, the point cloud 500 correspondingly is less accurate (e.g., because the points 502 of the point cloud 500 do not match the features of the image feature map 300). Correspondingly, as the value of the loss function decreases, the point cloud 500 is more accurate (e.g., because the points 502 of the point cloud 500 more closely match the features of the image feature map 300). The LSTM decoder 114 may provide the computed loss function, the differences between the features, etc. to the LSTM encoder 108 (e.g., either directly or through the read decoder 120) so that the LSTM encoder 108 adjusts, tunes, or otherwise modifies weights for computing the probabilities based on feedback from the LSTM decoder 114. In implementations in which the LSTM decoder 114 is configured to provide data to the LSTM encoder 108 through the read decoder 120, the read decoder 120 (e.g., similar to the write decoder 118) is configured to process the data from the LSTM decoder 114 to record the differences for adjustment of the weights for the LSTM encoder 108.

During subsequent iterations, the LSTM encoder 108 is configured to modify, refine, tune, or otherwise adjust the weights for the neural network 400 based on the feedback from the LSTM decoder 114. The LSTM encoder 108 may then compute new probabilities for features in the images 106, which is then used by the output engine 110 for generating points for a point cloud 500. As such, the LSTM decoder 114 and LSTM encoder 108 cooperatively adjust the weights for forming the point clouds 500 to more closely match the point cloud 500 to the features identified in the images 106. In some implementations, the LSTM encoder 108 and LSTM decoder 114 may perform a number of iterations. The number of iterations may be a predetermined number of iterations (e.g., two iterations, five iterations, 10 iterations, 50 iterations, 100 iterations, 200 iterations, 500 iterations, 1,000 iterations, 2,000 iterations, 5,000 iterations, 8,000 iterations, 10,000 iterations, 100,000 iterations, etc.). In some implementations, the number of iterations may change between models generated by the model generation system 100 (e.g., based on a user selection, based on feedback, based on a minimization or loss function or other algorithm, etc.). For instance, where the LSTM decoder 114 computes a loss function based on the difference between the features from the point cloud 500 and probabilities computed by the LSTM encoder 108, the number of iterations may be a variable number depending on the time for the loss function to satisfy a threshold. Hence, the LSTM encoder 108 may iteratively adjust weights based on feedback from the LSTM decoder 114 until the computed values for the loss function satisfy a threshold (e.g., an average of 0.05 mm, 0.1 mm, 0.15 mm, 0.2 mm, 0.25 mm, etc.). Following the final iteration, the output engine 110 is configured to provide the final iteration of the point cloud 500.

In some implementations, the output engine 110 is configured to merge the point cloud 500 with another point cloud or digital model of the user's dentition. For instance, the output engine 110 may be configured to generate a merged model from a first digital model (e.g., the point cloud 500) and a second digital model (e.g., a scan of a user's dentition, a scan of a dental impression of the user's dentition, etc.). In some implementations, the output engine 110 is configured to merge the point cloud 500 with another 3D model using at least some aspects as described in U.S. patent application Ser. No. 16/548,712, filed Aug. 22, 2019, the contents of which are incorporated herein by reference in its entirety.

The point cloud 500 may be used to manufacture a dental aligner specific to the user and configured to reposition one or more teeth of the user. The output engine 110 may be configured to provide the point cloud 500 to one or more external systems for generating the dental aligner. For instance, the output engine 110 may transmit the point cloud 500 to a 3D printer to print a positive mold using the point cloud. A material may be thermoformed to the positive mold to form a shape of a dental aligner, and the dental aligner may be cut from the positive model. As another example, the output engine 110 may transmit the point cloud 500 to a 3D printer to directly print a dental aligner.

Figure 6:
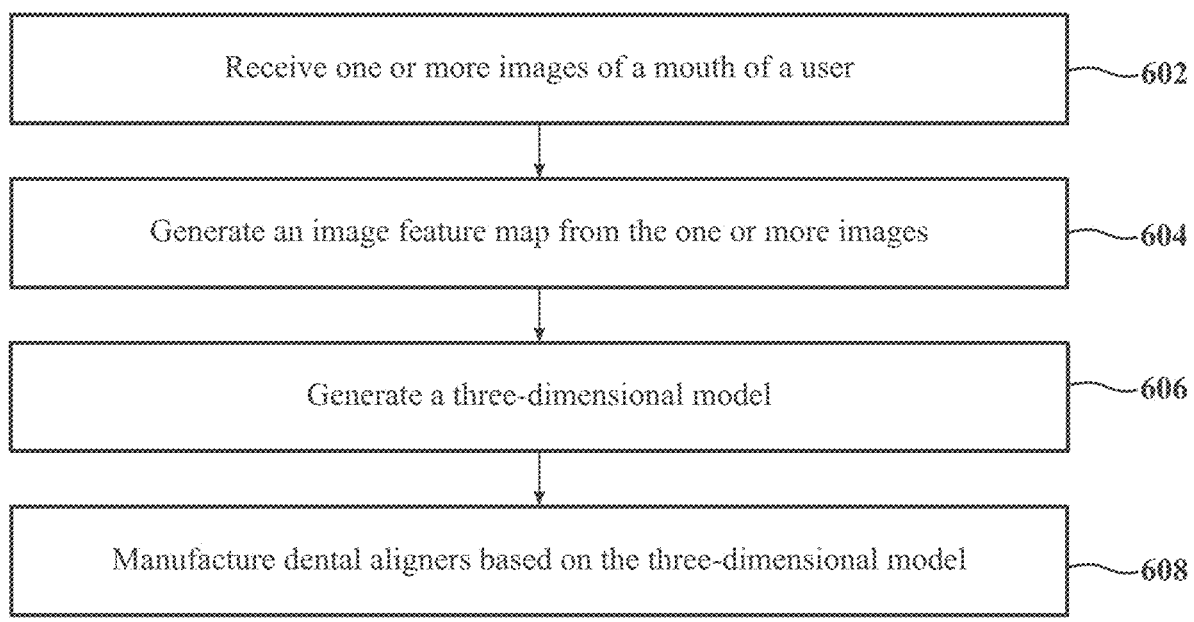
FIG. 6 is a diagram of a method of generating a 3D model from one or more 2D images, according to an illustrative embodiment.

Referring now to FIG. 6, a diagram of a method 600 of generating a three-dimensional model from one or more two-dimensional images is shown according to an illustrative embodiment. The method 600 may be implemented by one or more of the components described above with reference to FIG. 1-FIG. 5. As an overview, at step 602, a model generation system 100 receives one or more images 106 of a mouth of a user. At step 604, the model generation system 100 generates a point cloud 500 from the one or more images 106. At step 606, the model generation system generates a three-dimensional (3D) model from the point cloud 500. At step 608, dental aligners are manufactured based on the 3D model.

At step 602, a model generation system 100 receives one or more images 106 of a mouth of a user. The images 106 may be captured by the user. The user may capture the images 106 of the user's mouth with a dental appliance 200 positioned at least partially therein. In some implementations, the user is instructed how to capture the images 106. The user may be instructed to take at least three images 106. The images 106 may be similar to those shown in FIG. 2A-FIG. 2C. The user may capture the image(s) 106 on their mobile device or any other device having a camera. The user may upload, transmit, send, or otherwise provide the image(s) 106 to the model generation system 100 (e.g., to an email or account associated with the model generation system 100, via an internet-based portal, via a website, etc.). The model generation system 100 receives the image(s) 106 (e.g., from the mobile device of the user). The model generation system 100 uses the image(s) 106 for generating a 3D model of the user's mouth, as described in greater detail below.

At step 604, the model generation system 100 generates a point cloud 500 from the one or more images. In some embodiments, the model generation system 100 generates the point cloud 500 based on data from the one or more images 106 of the dental arch of the user (e.g., received at step 602). The model generation system 100 may parse the images 106 to generate image feature maps 300. The model generation system 100 may compute probabilities of features of the image feature map 300. The model generation system 100 may generate a point cloud 500 using the probabilities of the features of the image feature map 300. The model generation system 100 may determine features of the point cloud 500. The model generation system 100 may determine differences between the features of the point cloud and corresponding probabilities of the features of the image feature map. The model generation system 100 may train weights for computing the probabilities. The model generation system 100 may iteratively refine the point cloud 500 until a predetermined condition is met. Various aspects in which the model generation system 100 generates the point cloud 500 are described in greater detail below with reference to FIG. 7.

At step 606, the model generation system 100 generates a three-dimensional (3D) model. The model generation system 100 generates a 3D model of the mouth of the user (e.g., a 3D model of the upper and lower dental arch of the user). In some embodiments, the model generation system 100 generates a first 3D model of an upper dental arch of the user, and a second 3D model of a lower dental arch of the user. The model generation system 100 may generate the 3D models using the generated point cloud 500 (e.g., at step 604). In some embodiments, the model generation system 100 generates the 3D model by converting a point cloud 500 for the upper dental arch and a point cloud 500 for the lower dental arch into a stereolithography (STL) file, with the STL file being the 3D model. In some embodiments, the model generation system 100 uses the 3D model for generating a merged model. The model generation system 100 may merge the 3D model generated based on the point cloud 500 (e.g., at step 606) with another 3D model (e.g., with a 3D model generated by scanning the user's dentition, with a 3D model generated by scanning an impression of the user's dentition, with a 3D model generated by scanning a physical model of the user's dentition which is fabricated based on an impression of the user's dentition, etc.) to generate a merged (or composite) model.

At step 608, dental aligner(s) are manufactured based on the 3D model. In some embodiments, a manufacturing system manufactures the dental aligner(s) based at least in part on the 3D model of the mouth of the user. The manufacturing system manufactures the dental aligner(s) by receiving the data corresponding to the 3D model generated by the model generation system 100. The manufacturing system may manufacture the dental aligner(s) using the 3D model generated by the model generation system 100 (e.g., at step 608). The manufacturing system may manufacture the dental aligner(s) by 3D printing a physical model based on the 3D model, thermoforming a material to the physical model, and cutting the material to form a dental aligner from the physical model. The manufacturing system may manufacture the dental aligner(s) by 3D printing a dental aligner using the 3D model. In any embodiment, the dental aligner(s) are specific to the user (e.g., interface with the user's dentition) and are configured to reposition one or more teeth of the user.

Figure 7:
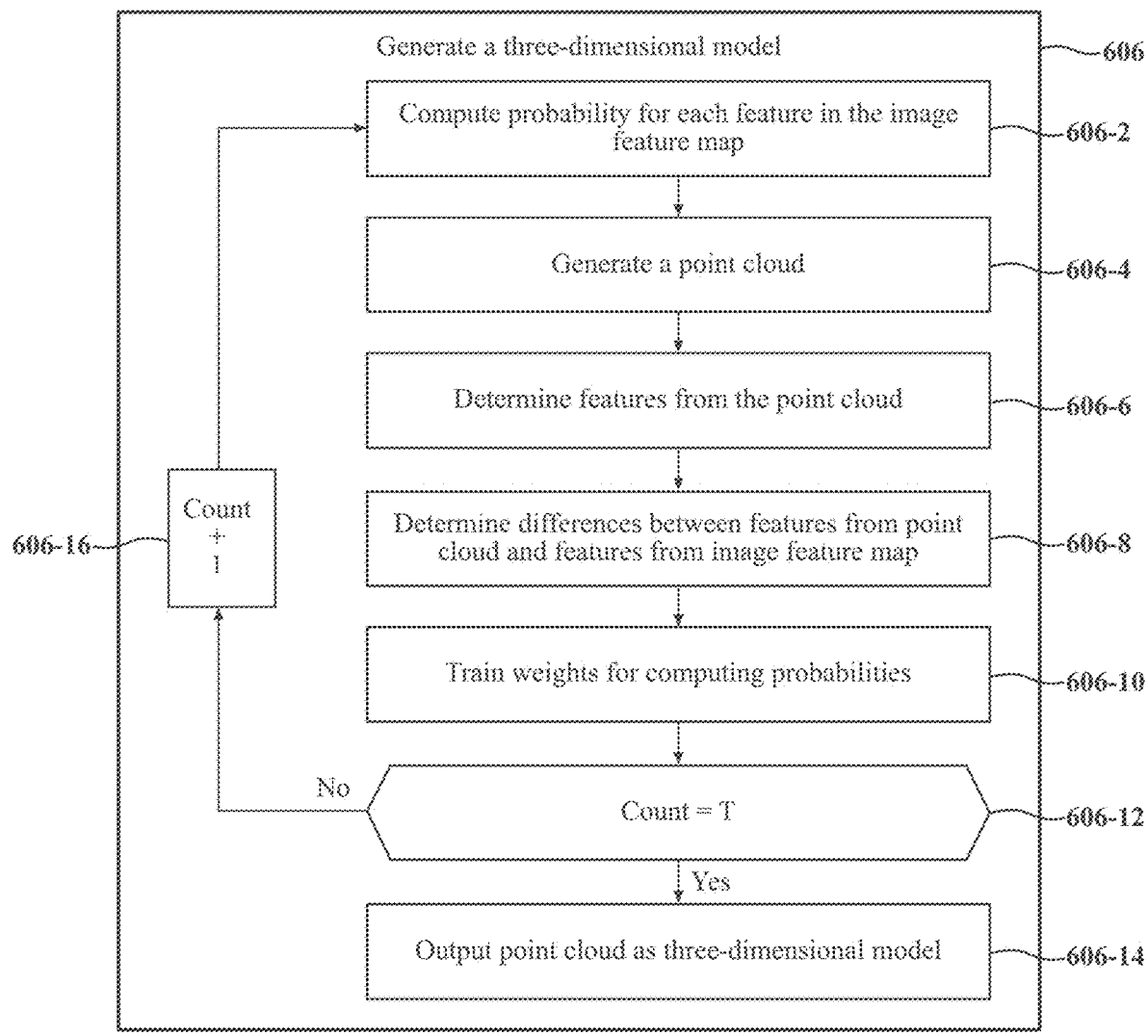
FIG. 7 is a diagram of a method of generating a point cloud from one or more 2D images, according to an illustrative embodiment.

Referring now to FIG. 7, a diagram of a method 700 of generating a point cloud 500 from one or more two-dimensional images 106 is shown according to an illustrative embodiment. The method 700 may be implemented by one or more of the components described above with reference to FIG. 1-FIG. 5C. As an overview, at step 702, the model generation system 100 generates an image feature map 300 using one or more images. At step 704, the model generation system 100 computes a probability of each feature in the image feature map 300. At step 706, the model generation system 100 generates a point cloud 500. At step 708, the model generation system 100 determines features of the point cloud 500. At step 710, the model generation system 100 determines differences between features of the point cloud and features of the image feature map 300. At step 712, the model generation system 100 trains weights for computing probabilities. At step 714, the model generation system 100 determines whether a predetermined condition is satisfied. Where the predetermined condition is not satisfied, the method 700 loops back to step 704. Where the predetermined condition is satisfied, at step 716, the model generation system 100 outputs a final iteration of the point cloud.

At step 702, the model generation system 100 generates an image feature map 300 from the one or more images 106. In some embodiments, a pre-trained image detector 102 of the model generation system 100 generates the image feature map 300 from the image(s) 106 (e.g., received at step 602 of FIG. 6). The image feature map 300 may include a classification of a plurality of portions of the image(s) 106. Each classification may correspond to a feature within the respective portion of the image(s) 106 to be represented in the point cloud.

In some embodiments the pre-trained image detector 102 may receive the image(s) 106 of the mouth of the user. The pre-trained image detector 102 portions the image(s) 106 received from the mobile device of the user. The pre-trained image detector 102 may portion the image(s) 106 into pre-determined sized portions. For instance, the pre-trained image detector 102 may portion the image(s) 106 into tiles 302. The tiles 302 may be equally sized portions of the image(s) 106. A plurality of tiles 302 corresponding to an image 106 may together form the image 106. The pre-trained image detector 102 may determine a classification of each of the portions of the image(s) 106 (e.g., of each tile 302 corresponding to an image 106). The pre-trained image detector 102 may determine the classification by parsing each portion of the image(s) 106. The pre-trained image detector 102 may parse portions of the image(s) 106 by leveraging one or more architectures, such as the MobileNet architecture. In some implementations, the pre-trained image detector 102 may include an image classifier 304, which may be embodied as a neural network. The image classifier 304 may include an input layer (e.g., configured to receive the tiles 302), one or more hidden layers including various pre-trained weights, and an output layer. The image classifier 304 may classify each of the tiles 302 based on the pre-trained weights. Each classification for a respective tile 302 may correspond to an associated feature. The pre-trained image detector 102 may generate the image feature map 300 using the portions of the image(s) 106 which include their respective classifications. For instance, following the tiles 302 being classified by the image classifier 304, the pre-trained image detector 102 may reconstruct the image(s) 106 as an image feature map 300 (e.g., by stitching together the tiles 302 to form the image feature map 300).

At step 704, the model generation system 100 computes a probability of features in the image feature map 300. In some embodiments, an LSTM encoder 108 of the model generation system 100 computes the probabilities. The LSTM encoder 108 may compute a probability for each feature of the image feature map 300 using one or more weights. The LSTM encoder 108 receives the image feature map 300 (e.g., generated at step 604). The LSTM encoder 108 parses the image feature map 300 to compute probabilities of features present in the image feature map 300. The LSTM encoder 108 may be embodied as a neural network including one or more nodes having weights which are tuned to detect certain features in an image feature map 300. The output of the neural network may be a probability of a corresponding feature in the image feature map. The LSTM encoder 108 may be tuned to detect and compute a probability of the potential features in the images 106 using the image feature map 300.

At step 706, the model generation system 100 generates a point cloud 500. In some embodiments, an output engine 110 of the model generation system 100 may generate the point cloud 500 using the probabilities (e.g., computed at step 702). The output engine 110 generates the point cloud 500 based on data from the LSTM encoder 108. The output engine 110 may generate the point cloud 500 using the probabilities which are highest. For instance, the output engine 110 may generate the point cloud 500 by parsing the data corresponding to the probabilities for each feature of the images 106. Each feature may include a corresponding probability. The output engine 110 may identify the most probable features of the images 106 (e.g., based on which probabilities are highest). The output engine 110 may generate a point cloud 500 using the most probable features of the images 106. The point cloud 500 includes a plurality of points which together define a surface contour of a 3D model. The surface contour may follow a surface of the user's dental arch such that the point cloud 500 matches, mirrors, or otherwise represents the user's dental arch.

At step 708, the model generation system 100 determines features of the point cloud 500. In some embodiments, a point cloud feature extractor 112 of the model generation system 100 determines one or more features from the point cloud 500 generated by the output engine 110 (e.g., at step 706). The point cloud feature extractor 112 may process the point cloud 500 to identify the features from the points of the point cloud 500. The point cloud feature extractor 112 may process the point cloud 500 independent of the probabilities computed by the LSTM encoder 108 and/or the image feature map 300. In this regard, the point cloud feature extractor 112 determines features from the point cloud 500 without feedback from the LSTM encoder 108. The point cloud feature extractor 112 may leverage data from one or more architectures or libraries, such as PointNet architecture, for determining features from the point cloud.

At step 710, the model generation system 100 determines differences between features of the point cloud 500 (e.g., determined at step 708) and the features of the image feature map 300 (e.g., generated at step 702). In some embodiments, an LSTM decoder 114 of the model generation system 100 determines a difference between the features determined by the point cloud feature extractor 112 and corresponding features from the image feature map 300. The LSTM decoder 114 may compare features determined by the point cloud feature extractor 112 (e.g., based on the point cloud 500) and corresponding features from the image feature map 300 (e.g., probabilities of features computed by the LSTM encoder 108). The LSTM decoder 114 may compare the features to determine how accurate the point cloud 500 computed by the output engine 110 is in comparison to the image feature map 300.

In some embodiments, the LSTM decoder 114 may compute a loss function using the features extracted from the point cloud 500 (e.g., by the point cloud feature extractor 112) and corresponding probabilities of each feature of the image feature map 300. The LSTM decoder 114 may determine the difference based on the loss function. The LSTM encoder 108 may train the weights (described in greater detail below) to minimize the loss function computed by the LSTM decoder 114.

At step 712, the model generation system 100 trains weights for computing the probabilities (e.g., used at step 704). In some embodiments, the LSTM encoder 108 of the model generation system 100 trains the one or more weights for computing the probability based on the determined difference (e.g., determined at step 710). The LSTM encoder 108 may tune, adjust, modify, or otherwise train weights of the neural network used for computing the probabilities of the features of the image feature map 300. The LSTM encoder 108 may train the weights using feedback from the LSTM decoder 114. For instance, where the LSTM decoder 114 computes a loss function of corresponding feature(s) of the image feature map 300 and feature(s) extracted from the point cloud 500, the LSTM decoder 114 may provide the loss function value to the LSTM encoder 108. The LSTM encoder 108 may correspondingly train the weights for nodes of the neural network (e.g., for that particular feature) based on the feedback. The LSTM encoder 108 may train the weights of the nodes of the neural network to minimize the loss function or otherwise limit differences between the features of the point cloud 500 and features of the image feature map 300.

At step 714, the model generation system 100 determines whether a predetermined condition is met or satisfied. In some embodiments, the predetermined condition may be a predetermined or pre-set number of iterations in which steps 704-712 are to be repeated. The number of iterations may be set by a user, operator, or manufacturer of the dental aligners, may be trained based on an optimization function, etc. In some embodiments, the predetermined condition may be the loss function satisfying a threshold. For instance, the model generation system 100 may repeat steps 704-712 until the loss function value computed by the LSTM decoder 114 satisfies a threshold (e.g., the loss function value is less than 0.1 mm). Where the model generation system 100 determines the predetermined condition is not satisfied, the method 700 may loop back to step 704. Where the model generation system 100 determines the predetermined condition is satisfied, the method 700 may proceed to step 716.

At step 716, the model generation system 100 outputs the final iteration of the point cloud 500. In some embodiments, the output engine 110 of the model generation system 100 may output the point cloud 500. The output engine 110 may output a point cloud 500 for an upper dental arch of the user and a point cloud 500 for a lower dental arch of the user. Such point clouds 500 may be used for generating a 3D model, which in turn can be used for manufacturing dental aligners for an upper and lower dental arch of the user, as described above in FIG. 6.

Figure 8:
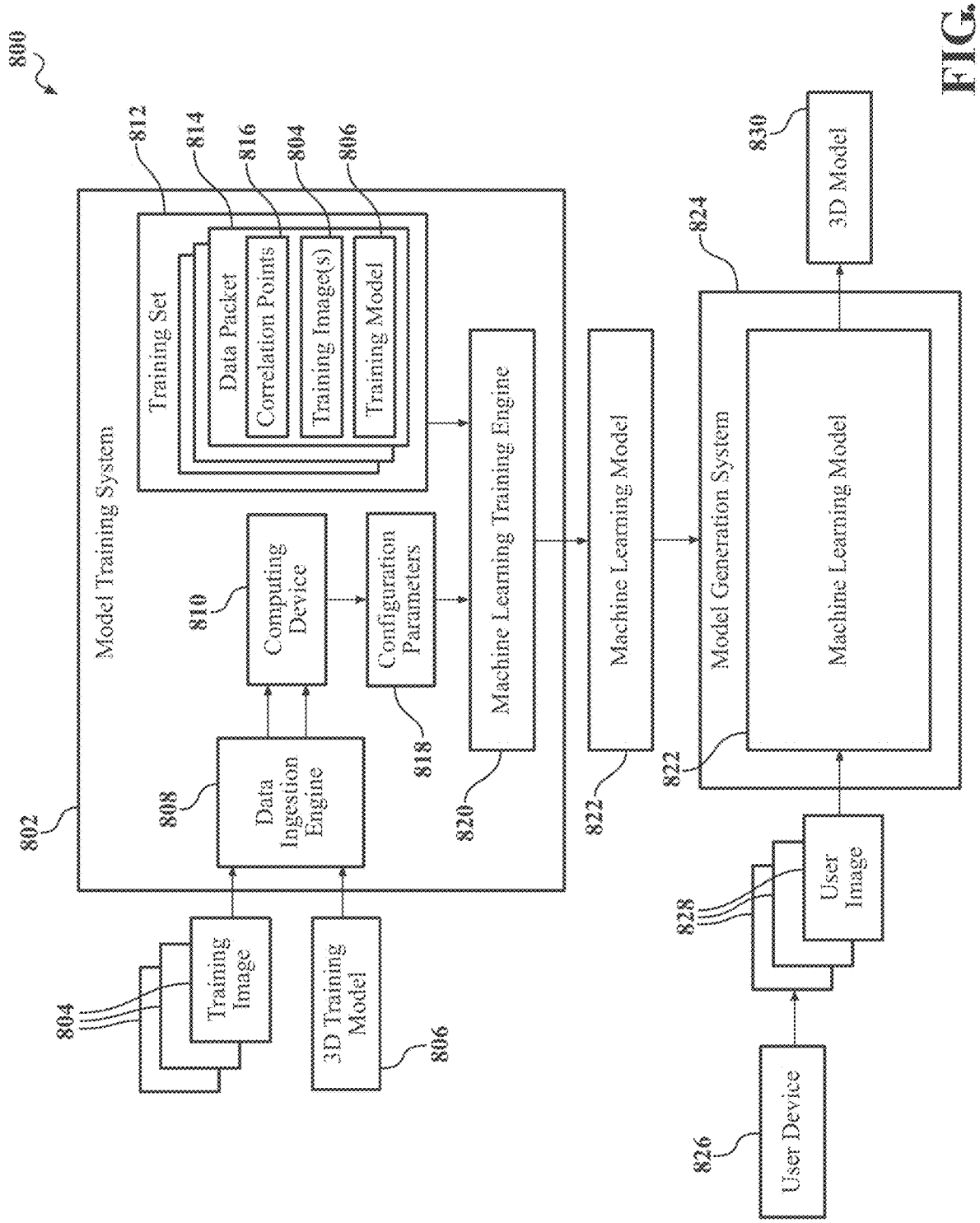
FIG. 8 is a diagram of a system for generating a 3D model from one or more 2D images, according to another illustrative embodiment.

Referring now to FIG. 8, a block diagram of another embodiment of a system 800 for generating a 3D model from one or more 2D images is shown, according to an illustrative embodiment. The system 800 is shown to include a model training system 802 and a model generation system 824. As described in greater detail below with respect to FIG. 8-FIG. 13, the model training system 802 may be configured to train a machine learning model 822 based on a training set 812 including one or more training images 804, a 3D training model 806, and a plurality of correlation points 816 between the images 804 and 3D training model 806. The model generation system 824 may be configured to apply the machine learning model 822 to one or more user images 828 (e.g., received from a user device 826) to generate a 3D model 830. The system 800 may include elements which are similar to those described above with reference to FIG. 1. For example, the model generation system 824 may include the pre-trained image detector 102 configured to process images received from a user. Similarly, the model generation system 824 may include the output engine 110 which is configured to apply the images received from the user to the machine learning model 822 to generate a 3D model 830 (which may be or include a point cloud as described above with reference to FIG. 1-7, may be a standard triangle language (STL) file used for stereolithography, a mesh, or other form of a 3D model).

The system 800 is shown to include a model training system 802. The model training system 802 may be any device(s), component(s), application(s), element(s), script(s), circuit(s), or other combination of software and/or hardware designed or implemented to generate, configure, train, or otherwise provide a machine learning model 822 for generating a 3D model from one or more user images. The model training system 802 may be configured to receive one or more training images 804 and a corresponding 3D training model 806. In some embodiments, the model training system 802 may be configured to receive the training images 804 and 3D training model 806 from a data source that stores a plurality of images and related 3D models. The training images 804 may be images captured by a patient or customer (as described above with reference to FIG. 1-FIG. 2C). The training images 804 may be images captured by a dental professional of a patient or customer when capturing a 3D representation of the patient's dentition (e.g., via a dental impression or a 3D scan of the patient's dentition). The 3D training model 806 may be a 3D representation of a patient's dentition. The 3D training model 806 may be captured by scanning the patient's dentition (e.g., via a 3D scanning device). The 3D training model 806 may be captured by scanning a representation of the patient's dentition (e.g., by scanning a dental impression of the patient's dentition, by scanning a physical model which is cast from a dental impression of the patient's dentition, etc.). Each of the images 804 may correspond to a respective training model 806. For example, for a given 3D training model 806 of a dental arch of a user, the model training system 802 may be configured to receive one or more 2D training images 804 of the dental arch of the user. As such, for a given 3D training model 806, one or more 2D training images 804 and the 3D training model 806 may both represent a common dental arch.

The model training system 802 is shown to include a data ingestion engine 808. The data ingestion engine 808 may be any device(s), component(s), application(s), element(s), script(s), circuit(s), or other combination of software and/or hardware designed or implemented to ingest the training images 804 and the 3D training model 806. In some embodiments, the data ingestion engine 808 may be configured to select a subset of training images 804 for use in training the machine learning model 822. The data ingestion engine 808 may be configured to select the subset of training images 804 based on a determined quality of the images. For example, the data ingestion engine 808 may include one or more aspects or features of the pre-trained image detector 102 described above with reference to FIG. 1. In some embodiments, the data ingestion engine 808 may be configured to ingest a series of training images 804, such as a video including a plurality of frames, with each of the frames being one of the series of training images 804. The data ingestion engine 808 may be configured to select a subset of the series of training images 804 (e.g., based on the determined quality of the frames as described above with respect to FIG. 1) for use in training the machine learning model 822. The data ingestion engine 808 may be configured to select (e.g., automatically) the series of training images 804 to include a plurality of training images 804 having a predetermined perspective (such as the perspectives shown in FIG. 2A-FIG. 2C). The data ingestion engine 808 may be configured to select the series of training images 804 having the predetermined perspective. The data ingestion engine 808 may be configured to select the series of training images 804 automatically (e.g., using a machine learning model) trained to detect the predetermined perspective in the training images. For example, the machine learning model may be a 2D segmentation model which is configured or trained to automatically identify individual teeth in an image, and determine (e.g., based on the individual teeth represented in the image) whether the image is suitable for including in the training set. In some embodiments, the data ingestion engine 808 may be configured to receive a selection of the training images 804 from a computing device (such as the computing device 810 described in greater detail below). In some embodiments, the data ingestion engine 808 may be configured to receive the training images 804 from a photo capturing application which is configured to capture images which are suitable for the training set.

In some embodiments, the data ingestion engine 808 may be configured to process the 3D training model 806 (e.g., to generate a modified 3D training model). For instance, the 3D training model 806 may be an initial training model which includes data corresponding to a 3D representation of an upper dental arch and a lower dental arch of a patient. As described in greater detail below with reference to FIG. 9 and FIG. 13, the data ingestion engine 808 may be configured to receive the initial training model, and generate a final 3D training model by separating the 3D representation of the upper dental arch from the 3D representation of the lower dental arch, and removing a 3D representation of gingiva in the respective arches such that the final 3D training model includes a 3D representation of a plurality of upper (or lower) teeth.

In some embodiments, the data ingestion engine 808 may be configured to generate a metadata file corresponding to the training images 804 and the associated 3D training model 806. The metadata file may be or include data that correlates or links a set of the training images 804 of a user with the 3D training model 806 of the dentition of the user represented in the set of training images 804. The data ingestion engine 808 may be configured to maintain the metadata file as the training images 804 and associated 3D training model 806 are processed to generate a corresponding data packet 814 (or data point, data package, or other structured data) of the training set 812, as described in greater detail below. In some embodiments, the metadata file may include data corresponding to the training images 804 and/or the device which was used to capture the images. For example, the metadata file may include data corresponding to an image contrast of the training images 804, a focus of the training images 804, a pixel size of the training images 804, a normalization factor of the training images 804, a scaling of the training images 804, a phone or camera type, a phone or camera model, photo orientation, etc. Such data may be used to standardize the training images 804 across the training set 812.

The model training system 802 is shown to include a computing device 810. The computing device 810 may be configured to determine, generate, or otherwise identify correlation points 816 between the training images 804 and the 3D training model 806. The correlation points 816 may be points that are commonly represented in both the training images 804 and the 3D training model 806. For example, the correlation points 816 may be a point located on a crown of a tooth, which is depicted, shown, or otherwise represented in both of the training images 803 and the 3D training model 806. In some embodiments, the computing device 810 may be or include one or more processors and memory of the model training system 802 configured to automatically generate the correlation points 816. In some embodiments, the computing device 810 may be a computer (e.g., a desktop, laptop, or other computer) configured to receive a selection of the correlation points 816. The computing device 810 may be configured to use the correlation points 816 for establishing a data packet 814 of a training set 812 that is used for training the machine learning model 822, as described in greater detail below. In some embodiments, the computing device 810 may be configured to update the metadata file with the correlation points 816.

The computing device 810 (or one or more other devices, components, or engines of the model training system 802) may be configured to generate, establish, populate, or otherwise provide a training set 812. The training set 812 may include a plurality of data packets 814. Each of the data packets 814 may include the training image(s) 804, and the associated 3D training model 806, and the correlation points 816 between the training images 804 and the associated 3D training model 806. As such, each data packet 814 of the plurality of data packets 814 may be representative of a respective dental arch which is used for training the machine learning model 822. The training set 812 may include data packets 814 for a plurality of different users, and for a plurality of different dental arches. As such, each data packet 814 may include data that represents a unique dental arch.

The computing device 810 may be configured to generate, establish, or otherwise provide one or more configuration parameters 818 for generating the machine learning model 822. In some embodiments, the configuration parameters 818 may be automatically set by a user (such as a technician) operating the computing device 810 to tune the training of the machine learning model 822. The user may tune the training of the machine learning model 822 based on outputs from the machine learning model 822. In some embodiments, the computing device 810 may be configured to automatically generate the configuration parameters 818. The computing device 810 may automatically generate the configuration parameters 818 based on model evaluation interfaces (such as those shown in FIG. 17). Various examples for automatically or manually generating configuration parameters 818 include accuracy of 3D models generated by the machine learning model 822 (in comparison to actual 3D models), processing time in which the machine learning model 822 generates the 3D models, etc.

The computing device 810 may be configured to provide the configuration parameters 818 to a machine learning training engine 820 for generating the machine learning model 822. In some embodiments, the configuration parameters 818 may include a number of iterations in which the machine learning training engine 820 is to perform to train the machine learning model 822 using the training set 812. In some embodiments, the configuration parameters 818 may include a loss weight for a set of hyperparameters that are used by the machine learning training engine 820. The computing device 810 may be configured to send, transmit, or otherwise provide the configuration parameters to the machine learning training engine 820 (e.g., along with the training set 812) for training the machine learning model 822.

The model training system 802 is shown to include a machine learning training engine 820. The machine learning training engine 820 may be any device(s), component(s), application(s), element(s), script(s), circuit(s), or other combination of software and/or hardware designed or implemented to generate, configure, train, or otherwise provide a machine learning model 822 for generating a 3D model from one or more user images. The machine learning training engine 820 may be configured to receive the training set 812 and the configuration parameters 818 (e.g., from the computing device 810 and/or from another device or component of the model training system 802) for generating the machine learning model 822. In some embodiments, the machine learning training engine 820 may be similar in some respects to the model generation engine 104 described above with respect to FIG. 1. In some embodiments, the machine learning training engine 820 may be similar to or incorporate features from a mesh R-CNN training system, such as the system described in "Mesh R-CNN" [Georgia Gkioxari, Jitendra Malik, & Justin Johnson, *Mesh R-CNN*, Facebook AI Research (FAIR) (Jan. 25, 2020)], the contents of which are incorporated by reference in its entirety. The machine learning training engine 820 may be configured to generate the machine learning model 822 for generating a 3D model from images of a dental arch of a user (such as a patient who is to receive or is receiving dental treatment), as described in greater detail below. Further details corresponding to the model training system 802 are described in greater detail below with respect to FIG. 9 through FIG. 13.

The system 800 is shown to include a model generation system 824. The model generation system 824 may be or include any device(s), component(s), application(s), element(s), script(s), circuit(s), or other combination of software and/or hardware designed or implemented to generate a 3D model 830 from a set of 2D images 828 received from a user device 826. The model generation system 824 may include or leverage the machine learning model 822 generated by the machine learning training engine 820 for generating the 3D model 830.

The model generation system 824 may be configured to receive one or more user images 828 from a user device 826. The user device 826 may be a mobile device (e.g., a smart phone, tablet, etc.). In some embodiments, the user device 826 may be associated with a user (such as the user depicted in the user image 828). In some embodiments, the user device 826 may be a generic device (e.g., a device used to capture images 828 of a plurality of users, such as at an intraoral scanning location, dental or medical office, etc.). The user device 826 may be a computing device (e.g., similar to the computing device 810 described above). The user device 826 may be configured to generate, capture, or otherwise provide the user images 828 to the model generation system 824. In some embodiments, the user device 826 may be configured to provide the user images 828 to the model generation system 824 by uploading the images 828 to a portal maintained by or otherwise associated with the model generation system 824. In some embodiments, the user device 826 may be configured to provide the user images 828 to the model generation system 824 by transmitting the images 828 to an address associated with the model generation system 824 (e.g., an IP address associated with a server which hosts the model generation system 824, an email address associated with an account linked to the model generation system 824, etc.). The one or more user images 828 may be representative of a common dental arch. In some embodiments, the one or more images may be similar in some respect to the images shown in FIG. 2A-FIG. 2C described above. In some instances, the user images 828 may be captured by the user of the user's dental arch. In some instances, the user images 828 may be captured by the user of another user's dental arch. In either instance, the user images 828 may represent a common dental arch, and may be used to generate a 3D model 830 of the dental arch represented in the images.

The model generation system 824 is shown to include the machine learning model 822 (e.g., generated or otherwise trained by the machine learning training engine 820). The model generation system 824 may be configured to transmit, send, or otherwise provide the received user images 828 to the machine learning model 822 to generate the 3D model 830 of the dental arch represented in the user images 828. The model generation system 824 may be configured to execute an instance of the machine learning model 822 by providing the user images 828 as an input to the machine learning model 822. The machine learning model 822 may be configured to generate, as an output, a 3D model 830 of the dental arch based on the user images 828. In some embodiments, the machine learning model 822 may be configured to generate a plurality of 3D models of each perspective of the dental arch included in a respective image 828. The machine learning model 822 may be configured to stitch together the plurality of 3D models of each perspective dental arch to establish, generate, or otherwise form the 3D model 830 as an output.

The 3D model 830 may be used to generate, construct, or otherwise manufacture one or more dental aligners as described above with reference to FIG. 1-FIG. 6. For example, in some embodiments, a manufacturing system manufactures the dental aligner(s) based at least in part on the 3D model 830 of the dental arch of the user. The manufacturing system may manufacture the dental aligner(s) by receiving the data corresponding to the 3D model 830 generated by the model generation system 824. The manufacturing system may manufacture the dental aligner(s) by 3D printing a physical model based on the 3D model 830, thermoforming a material to the physical model, and cutting the material to form a dental aligner from the physical model. The manufacturing system may manufacture the dental aligner(s) by 3D printing a dental aligner using the 3D model 830. In these or other embodiments, the dental aligner(s) are specific to the user and are configured to reposition one or more teeth of the user.

In some embodiments, the 3D model 830 may be used to track a progress of dental aligner treatment for a patient. For example, a patient may be treated using dental aligners to move the patient's teeth in various stages from an initial position (e.g., prior to treatment) to a final position (e.g., following treatment). During treatment, the patient's teeth may move from the initial position (e.g., at a first stage of a treatment plan) to one or more intermediate positions (e.g., at one or more intermediate stages of the treatment plan), and to the final position (e.g., at a final stage of the treatment plan). Each of the stages of treatment may be represented in a patient file as a target 3D model (e.g., a first 3D model representing the first stage of treatment, one or more intermediate 3D models representing the intermediate stages of treatment, and a final 3D model representing the final stage of treatment). At each stage, the patient may administer one of a series of dental aligners that are configured to move the patient's teeth from the current stage of treatment to the subsequent stage of treatment.

In some implementations, the patient may upload the user images 828 following completion of one stage of treatment. For example, the patient may be prompted to upload images 828 at various intervals (such as daily, weekly, every two weeks, following completion of a stage of treatment, every six months or year following treatment via dental aligners, whenever the patient requests to check their progress, etc.). The patient may be prompted to upload images 828 to ensure that the patient's teeth are progressing according to the treatment plan, or to ensure that the patient's teeth have not reverted back to a position prior to treatment via dental aligners. The model generation system 824 may be configured to generate the 3D model 830 based on the user images 828. The 3D model 830 may then be compared to the 3D model included in the patient file to determine whether the patient's teeth moved according to the treatment plan for the patient. The patient file may include a 3D model for each stage of treatment (e.g., an initial 3D model corresponding to an initial stage of treatment, one or more intermediate 3D models corresponding to intermediate stages of treatment, and a final 3D model corresponding to the final stage of treatment). The 3D model 830 generated by the model generation system 824 may be compared to the 3D models from the patient file. For example, where the 3D model 830 generated from the user images 828 matches (or substantially matches) the 3D model included in the patient file corresponding to the particular stage of the treatment plan, the patient may be determined to be progressing in accordance with the treatment plan, since the patient's teeth are moving according to the progression defined in the treatment plan from their initial position prior to treatment, to one or more intermediate positions, and to a final position following treatment. However, where the 3D model 830 generated from the user images 828 does not match (or substantially match) the 3D model included in the patient file corresponding to the particular stage of the treatment plan, the patient may be determined to not be progressing in accordance with the treatment plan. Such embodiments may provide for early onset identification of a need for a mid-course correction of a treatment plan. For example, when a patient is determined to not be progressing according to the treatment plan, the patient file may be flagged to generate a new treatment plan from the patient's current teeth positions (and, correspondingly, new dental aligners according to the new treatment plan). As another example, when the patient is determined to not be progressing according to the treatment plan, the patient may be prompted to skip one or more aligners (e.g., to advance to another stage of treatment where the patient is progressing faster than expected or predicted under the treatment plan), use a particular aligner out of order, such that the patient's teeth move back on course according to the treatment plan.

In some embodiments, the 3D model 830 may be rendered on a user interface and displayed back to a user. For example, the model generation system 824 may be configured to transmit, send, or otherwise provide the 3D model 830 to the user device 826 for rendering to the user. In some embodiments, the model generation system 824 may be configured to generate a user interface for displaying at the user device 826. The user interface may include, for example, the 3D model 830 generated based on the user images 828. In some embodiments, the user interface may include another 3D model. For example, the user interface may include the 3D model 830 generated based on the user images 828 and an expected 3D model (such as the 3D model from the patient file corresponding to the current stage of treatment). Such embodiment may allow the user to track their progress in comparison to the target 3D model corresponding to the treatment. As another example, the user interface may include the 3D model 830 and a prior (and/or subsequent) 3D model. The prior 3D model may be the 3D model from the patient file corresponding to a prior stage of the treatment plan. The prior 3D model may be a 3D model generated from a previous user image 828. The subsequent 3D model may be the 3D model from the patient file corresponding to a subsequent stage of the treatment plan. The user may view the prior 3D model, the current 3D model 830, and/or a subsequent 3D model to show a progress of the patient's treatment.

Figure 9:
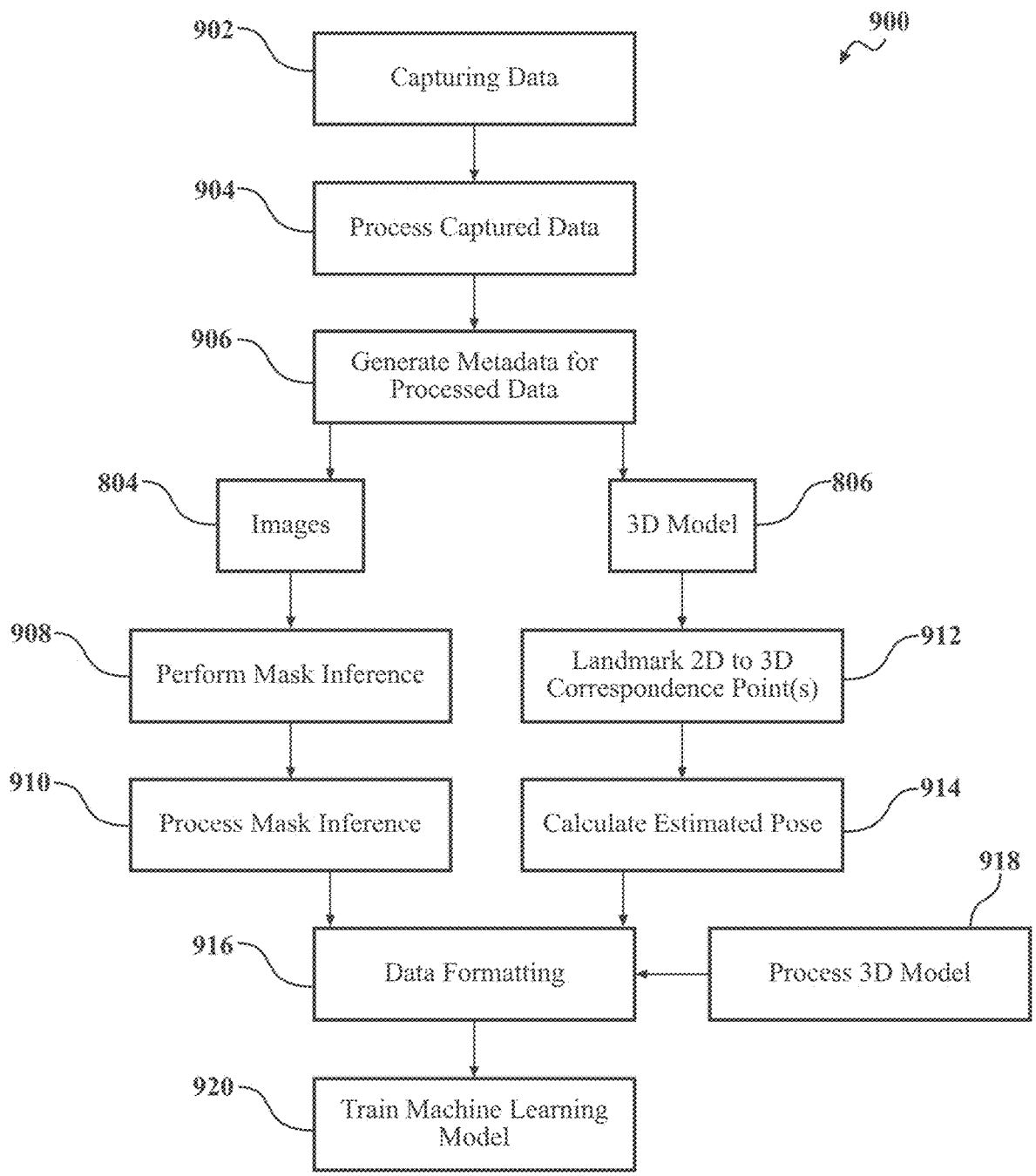
FIG. 9 a diagram of a method of training a machine learning model, according to an illustrative embodiment.
Figure 10B:
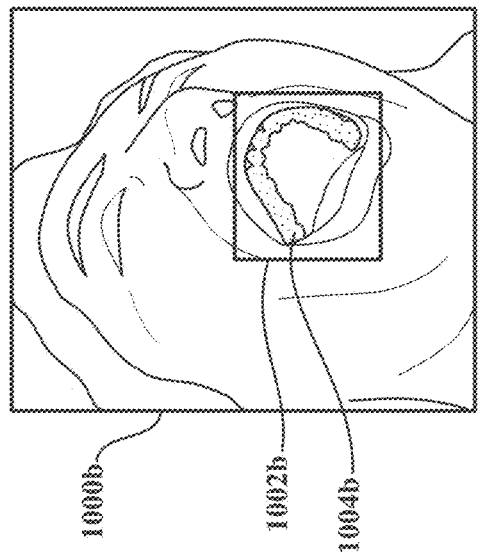
FIG. 10B is an illustration of a second example training image, according to an illustrative embodiment.
Figure 10D:
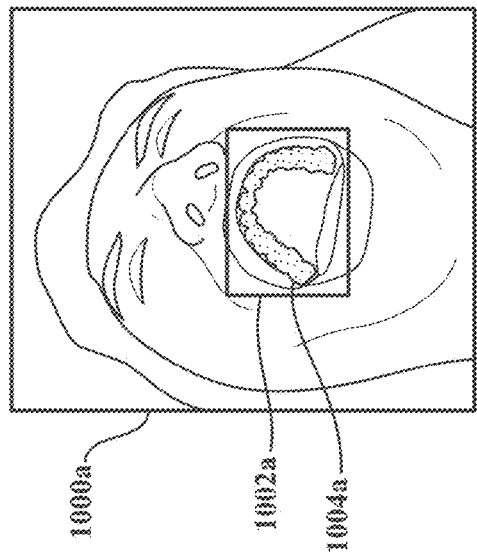
FIG. 10D is an illustration of a fourth example training image, according to an illustrative embodiment.
Figure 10A:
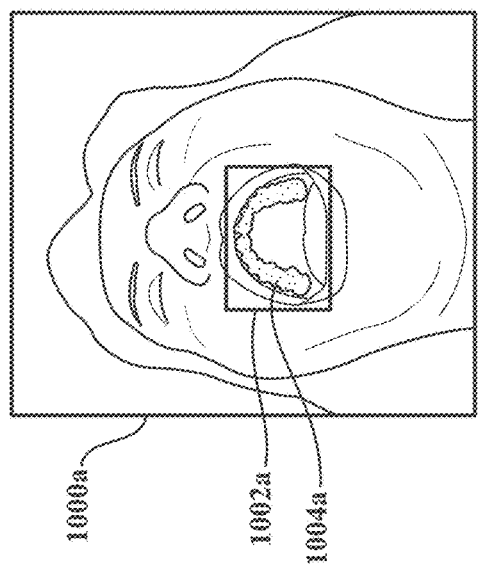
FIG. 10A is an illustration of a first example training image, according to an illustrative embodiment
Figure 10C:
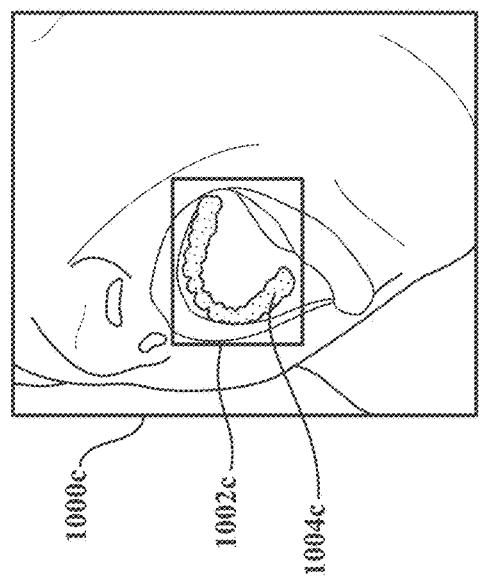
FIG. 10C is an illustration of a third example training image, according to an illustrative embodiment.

Referring now to FIG. 9, a flow chart showing an example method 900 of training a machine learning model 822 is shown. The method 900 may be performed by one or more of the components described above with reference to FIG. 8, such as the model training system 802. As a brief overview, at step 902, the model training system 802 captures data (such as training images 804 and a 3D training model 806). At step 904, the model training system 802 processes the captured data. At step 906, the model training system 802 generates metadata for the processed data. At step 908, the model training system 802 performs a mask inference, and at step 910, the model training system 802 processes the mask inference. At step 912, the model training system 802 landmarks 2D to 3D correlation points 816. At step 914, the model training system 802 calculates an estimated pose. At step 916, the model training system 802 performs data formatting. At step 918, the model training system 802 processes the 3D model 806. At step 920, the model training system 802 trains the machine learning model 822. These steps are described in greater detail below with reference to FIG. 8 and FIG. 9 in conjunction with FIG. 10-FIG. 13.

At step 902, the model training system 802 receives data (such as training images 804 and a 3D training model 806). In some embodiments, the model training system 802 may receive or retrieve the data from a data structure or source that stores a plurality of images and corresponding 3D models. As described above, each of the 3D training models 806 may be representative of a unique dental arch. The model training system 802 may capture, retrieve, or otherwise receive a plurality of 3D training models 806 and a set of training images 804 that include at least a portion of a representation of the dental arch associated with a respective 3D training model 806. In other words, the model training system 802 may receive, for a particular dental arch that is to be used in the training set 812, a 3D training model 806 of the dental arch and one or more training images 804 which include a representation of at least a portion of the dental arch.

At step 904, the model training system 802 processes the received data. In some embodiments, the data ingestion engine 808 of the model training system 802 may process the received data (e.g., received at step 902). The data ingestion engine 808 may process the captured data by selecting a subset of the training images 804 which are to be used for training the machine learning model 822. For example, the training images 804 received at step 902 may include a video including a series of frames, each of which show a perspective view of a mouth of a patient. The data ingestion engine 808 may select a subset of frames from the series of frames of the video. In some embodiments, the data ingestion engine 808 may select a subset of frames based on a quality of the subset of frames. In some embodiments, the data ingestion engine 808 may select a subset of frames based on a particular perspective view of the dental arch of the user depicted in a respective frame. In some embodiments, the data ingestion engine 808 may process the 3D model as described in greater detail below with reference to step 918. In other words, step 918 may be performed when the 3D training model 806 is ingested or otherwise captured at step 902, or step 918 may be performed subsequent to one or more of the following steps described in greater detail below.

At step 906, the model training system 802 generates metadata for the processed data. In some embodiments, the data ingestion engine 808 may generate the metadata for the processed data. In some embodiments, the data ingestion engine 808 may generate a metadata file including the metadata for the training images 804 and the associated 3D training model 806. The metadata file may be or include data that correlates or links a set of the training images 804 of a user with the 3D training model 806 of the dentition of the user represented in the set of training images 804. In some embodiments, the metadata file may include data corresponding to the training images 804. For example, the metadata file may include data corresponding to an image contrast of the training images 804, a focus of the training images 804, a pixel size of the training images 804, a focal length of a camera used to capture the training images 804, a normalization factor of the training images 804, a scaling of the training images 804, etc. Such data may be used to standardize the training images 804 across the training set 812.

Referring now to FIG. 9 and FIG. 10A-FIG. 10D, at step 908, the model training system 802 performs a mask inference. Specifically, FIG. 10A-FIG. 10D show respective training images 1000a-d. As shown in FIG. 10A-FIG. 10D, each of the images 1000a-d may include a bounding box 1002a-d surrounding a dental arch of the person depicted in the respective image 1000a-d, and a mask 1004a-d applied to the dental arch. The model training system 802 may apply the mask 1004a-d by performing object recognition of teeth within the image 1000a-d, and generating an overlay over the teeth within the image 1000a-d. As such, the mask 1004a-d may be or include an overlay which is applied to particular objects or features within an image 1000a-d (such as the teeth as shown in FIG. 10A-FIG. 10D). The model training system 802 may apply the bounding box 1002a-d to encompass each of the teeth recognized in the image 1000a-d (e.g., to encompass the mask 1004a-d within the image 1000a-d). In some embodiments, the model training system 802 may include or access one or more masking systems that are configured to automatically generate a mask 1004a-d and bounding box 1002a-d for an image 1000a-d. In some embodiments, the model training system 802 may include or otherwise access masking software hosted on a server which is remote from the system 800 via an application program interface (API) for the masking software. For instance, the model training system 802 may access Detectron2 developed by FAIR for masking the images 1000 of the training set. The mask 1004 may define a perimeter or edge of the teeth shown or represented in the dental arch. In some embodiments, the mask 1004a-d may be applied to individual teeth (e.g., on a tooth-by-tooth basis). In some embodiments, the mask 1004a-d may be applied to a subset of teeth (e.g., based on a tooth type, such as incisors, molar, premolar, etc.). In some embodiments, the mask 1004a-d may be applied to each of the teeth located in a common dental arch (e.g., maxillary teeth and mandibular teeth).

At step 910, the model training system 802 processes the mask inference. In some embodiments, the model training system 802 processes the mask inference (e.g., the mask 1004a-d applied to the training images 1000 a-d) to determine that the masks 1004 a-d are properly applied to the dental arch represented in the training image 1000 a-d. The model training system 802 may display, render, or otherwise provide the images 1000 a-d including the mask 1004 a-d to the computing device 810 for performing a quality control of the mask 1004 a-d. In some implementations, the model training system 802 may receive one or more adjustments of the mask 1004 a-d (e.g., from the computing device 810). The adjustments may be made by dragging a portion of an edge of the mask 1004 a-d to align with a corresponding portion of the dental arch in the image 1000 a-d, adjusting the bounding box 1002a-d, etc.

Figure 11:
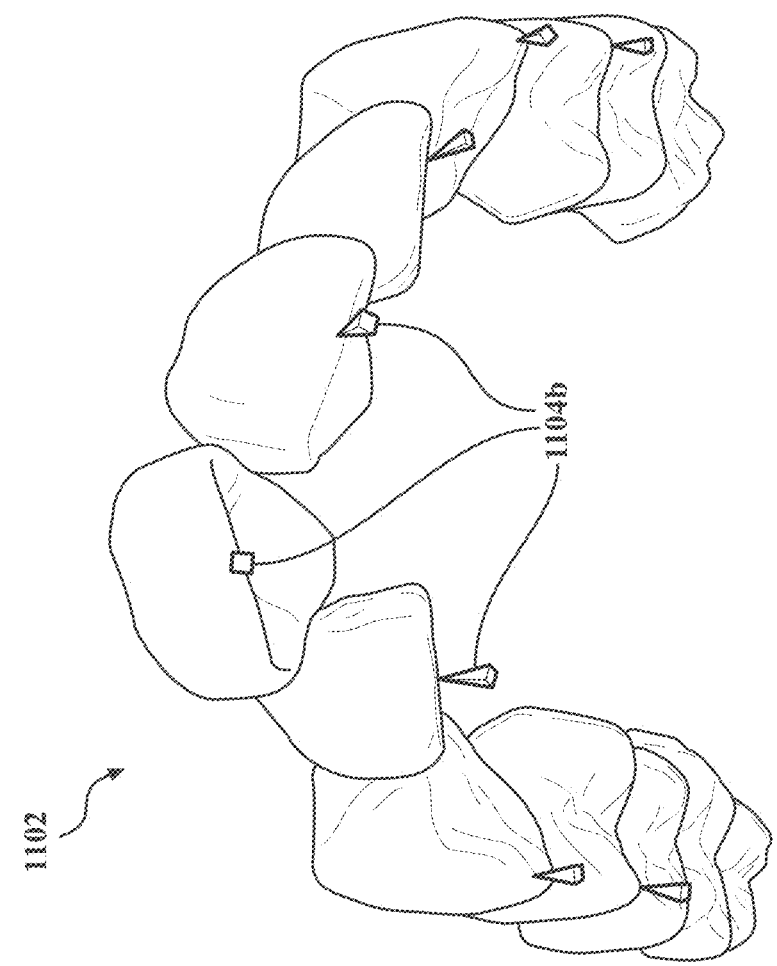
FIG. 11 are illustrations of a training image and a corresponding 3D training model, according to an illustrative embodiment.
Figure 11:
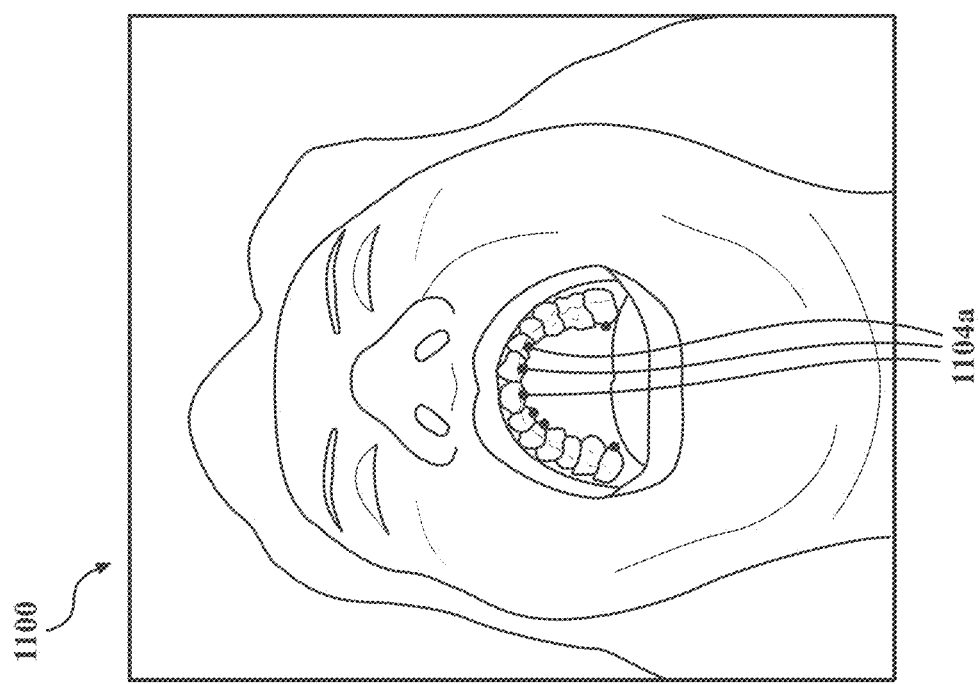

Referring now to FIG. 9 and FIG. 11, at step 912, the model training system 802 landmarks 2D to 3D correlation points 816. Specifically, FIG. 11 shows a training image 1100 and a corresponding 3D training model 1102. The training image 1100 and corresponding 3D training model 1102 may be one of the data packets 814 of the training set 812 received at step 902. As shown in FIG. 11, the training image 1100 and 3D training model 1102 may include correlation points 1104a-b. Specifically, the training image 1100 includes correlation points 1104a, and the 3D training model 1102 includes correlation points 1104b. Each of the correlation points 1104a-b may be representative of or otherwise identify a common point represented in both the training image 1100 and 3D training model 1102. As shown in FIG. 11, a given correlation point 1104 may map to a respective tooth that is shown in both of the training image 1100 and the 3D training model 1102. In some embodiments, the computing device 810 may automatically generate the correlation points 1104a-b in the training image 1100 and the 3D training model 1102. For example, the computing device 810 may analyze the images 1100 and the 3D training model 1102 to identify each of the individual teeth located in the images 1100 and 3D training model 1102. The computing device 810 may be configured to apply one or more labels to each of the individual teeth in both the images 1100 and 3D training model 1102. The computing device 810 may be configured to automatically generate the correlation points 1104a-b at a mid-point of each of the teeth represented in both of the training images 1100 and the 3D training model 1102. In some embodiments, the computing device 810 may receive a selection (e.g., from a user of the computing device 810) of the correlation points 1104 in the training image 1100 and the 3D training model 1102.

Figure 12:
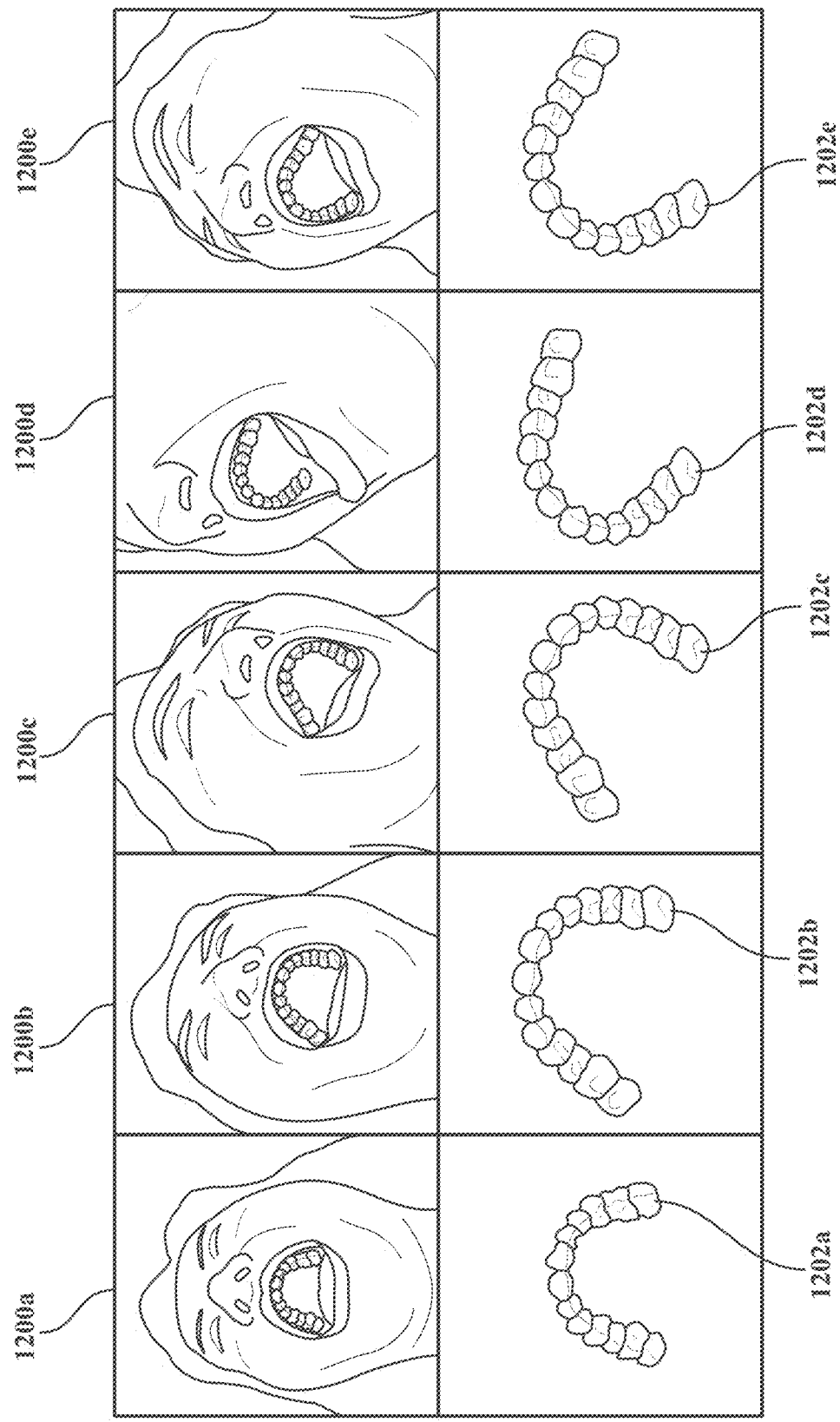
FIG. 12 are illustrations of a series of training images and corresponding poses of the 3D training model for the training images, according to an illustrative embodiment.

Referring now to FIG. 9 and FIG. 12, at step 914, the model training system 802 calculates an estimated pose. Specifically, FIG. 12 shows a series of training images 1200 and corresponding poses of the 3D training model 1202 for the training images 1200. In some embodiments, the model training system 802 calculates the estimated pose of the user in the training image 1200 by performing a camera constant, rotation, and translation (KRT) analysis (or other pose alignment analysis) of the images. In some embodiments, the model training system 802 calculates the estimated pose of the user in the training image 1200 using metadata corresponding to the camera used to capture the image 1200 (e.g., one or more intrinsic properties of the camera that captured the images 1200, such as focal length, principal axis, etc.), a rotation of the dental arch reflected in the image, and a translation of the dental arch reflected in the image. The model training system 802 may calculate the estimated pose of a respective training image 1200, to match the pose of the 3D training model with the estimated pose of the user in the training image 1200. For example, the model training system 802 may translate, rotate, or otherwise modify the pose of the 3D training model to match the calculated pose for the training image 1200.

In some embodiments, steps 908 through 914 may be executed in parallel. For example, steps 908 through 910 may be performed on the images while steps 912 through 914 may be performed on the 3D model. In some embodiments, steps 908 through 914 may be executed serially (e.g., the model training system 802 may landmark the 2D to 3D correlation points 816 following processing the mask inference).

At step 916, the model training system 802 performs data formatting. In some embodiments, the model training system 802 may format the training images 804, 3D training models 806, and correlation points 816 (generally referred to as a training set 812) into a format acceptable for training a machine learning model. For example, the model training system 802 may format the training set 812 into a common objects in context (COCO) data format. The model training system 802 may format the training set 812 prior to providing the training set 812 to the machine learning training engine 820 for training the machine learning model 822.

Figure 13:
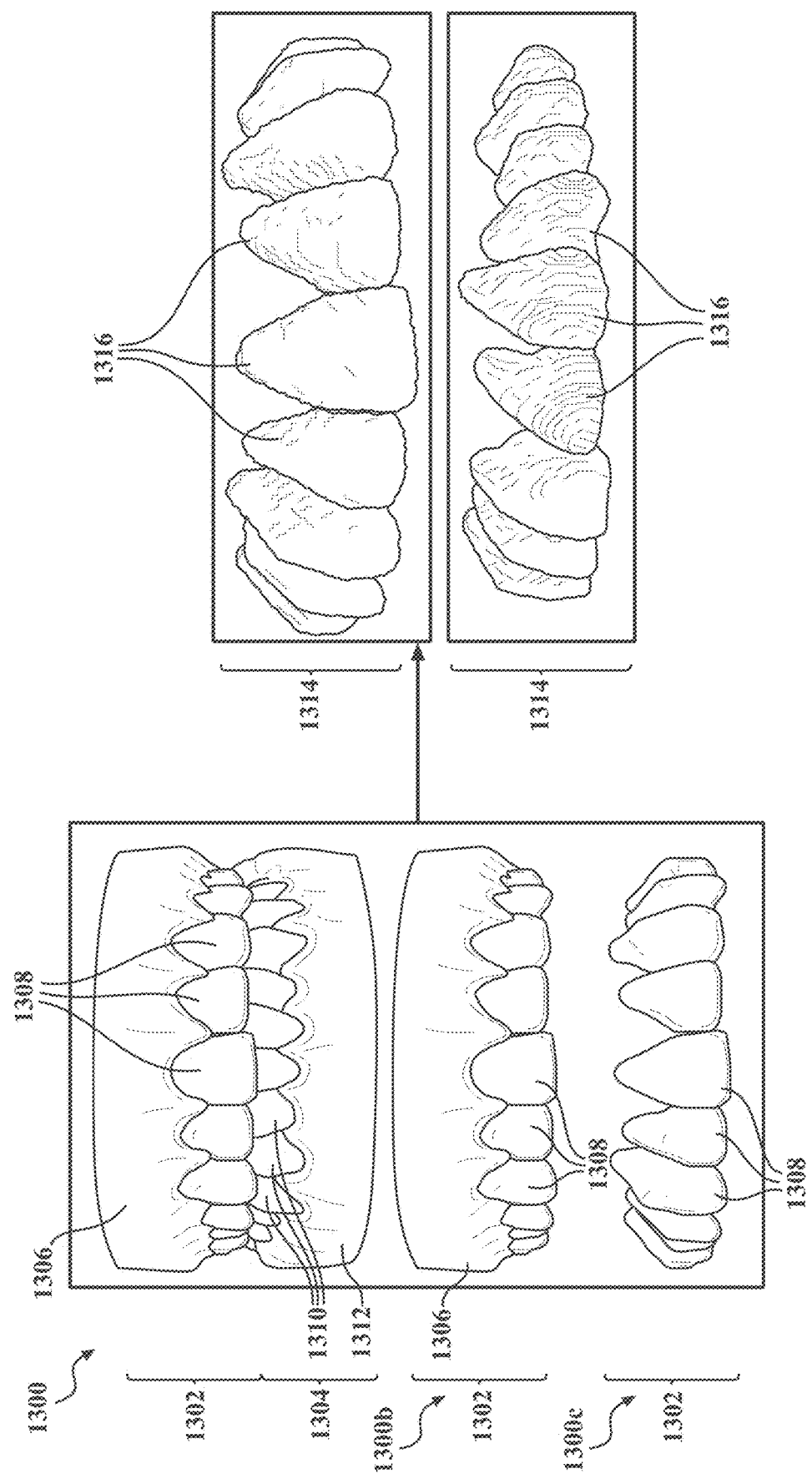
FIG. 13 is an illustration of a processing progression of a 3D model which is used in a training set, according to an illustrative embodiment.

Referring now to FIG. 9 and FIG. 13, at step 918, the model training system 802 processes the 3D model 1300. Specifically, FIG. 13 shows a processing progression of a 3D model 806 that is used in the training set 812, according to an illustrative embodiment. As shown in FIG. 13, the model training system 802 may receive an initial 3D training model 1300*a* that includes a 3D representation 1302 of an upper dental arch of a user and a 3D representation 1304 of a lower dental arch of the user. Each of the 3D representations 1302, 1304 may include a representation of gingiva 1306, 1312 and teeth 1308, 1310 for the corresponding dental arch. The model training system 802 may process the 3D model 1300*a* by separating the 3D model 1300 into two 3D models (e.g., a first 3D model of the 3D representation 1302 of the upper dental arch and a second 3D model of the 3D representation 1304 of the lower dental arch), which may be a first iteration of a processed 3D model 1300*b* from the initial 3D model 1300*a*. The model training system 802 may process each of the first iteration of 3D models 1300*b* as shown in FIG. 13 to remove the 3D representation of gingiva 1306 from the 3D representation of teeth 1308. As such, the model training system 802 may process the first iteration of the 3D models 1300*b* to form a second iteration of the 3D model 1300*c* that includes the 3D representation of teeth 1308 without any 3D representations of gingiva 1306. The model training system 802 may generate a final iteration 1314 of the processed 3D model 1300 by voxelizing the 3D representations of the teeth 1308 in the 3D model 1300*c*. As such, the final iteration 1314 of the processed 3D model 1300 includes voxelized 3D representations of teeth 1316 that correspond to the 3D representations of teeth 1308 in the initial 3D model 1300. The model training system 802 may use the final iteration 1314 of the 3D model 1300 as the 3D training model 806 for training the machine learning model 822.

In some embodiments, the model training system 802 may add, generate, or otherwise incorporate gingiva into the final iteration 1314 of the 3D model 1300. For example, the model training system 802 may be configured to generate gingiva based on one or more parameters, traits, shapes, or other characteristics of the voxelized 3D representations of teeth 1316 in the final iteration of the model 1314. In some embodiments, the model training system 802 may be configured to provide the final iteration 1314 of the 3D model 1300 to a machine learning model which is trained to add or incorporate voxelized gingiva into voxelized 3D representations of teeth 1316 in a model 1300.

At step 920, the model training system 802 trains the machine learning model 822. The model training system 802 may transmit, send, or otherwise provide the training set 812 to machine learning training engine 820 to train the machine learning model 822. In some embodiments, the model training system may provide the training set and one or more configuration parameters to the machine learning training engine 820 for training the machine learning model 822. In some embodiments, the configuration parameters 818 may include a number of iterations in which the machine learning training engine 820 trains the machine learning model 822 using the training set 812. In some embodiments, the configuration parameters 818 may include a loss weight for a set of hyperparameters that are used by the machine learning training engine 820. The computing device 810 may be configured to send, transmit, or otherwise provide the configuration parameters to the machine learning training engine 820 (e.g., along with the training set 812) for training the machine learning model 822. The machine learning training engine 820 may receive and use the training set 812 and the configuration parameters 818 (e.g., from the computing device 810 and/or from another device or component of the model training system 802) as an input for training the machine learning model 822. The machine learning training engine 820 may train one or more weights for a neural network (such as the neural network shown in FIG. 4 and described above) based on data from the training images 804, the 3D training model 806, and the correlation points 816.

In some embodiments, the 3D training models 806 and/or training images 804 may include or be represented in color. In such embodiments, the machine learning training engine 820 may be configured to train the machine learning model 822 to detect, determine, or otherwise predict a color of the 3D model based on data from one or more images. The machine learning training engine 820 may be configured to train one or more weights of a neural network to detect, determine, or otherwise predict a color of the 3D model based on one or more images which are provided (e.g., as an input) to the machine learning model 822.

Figure 14:
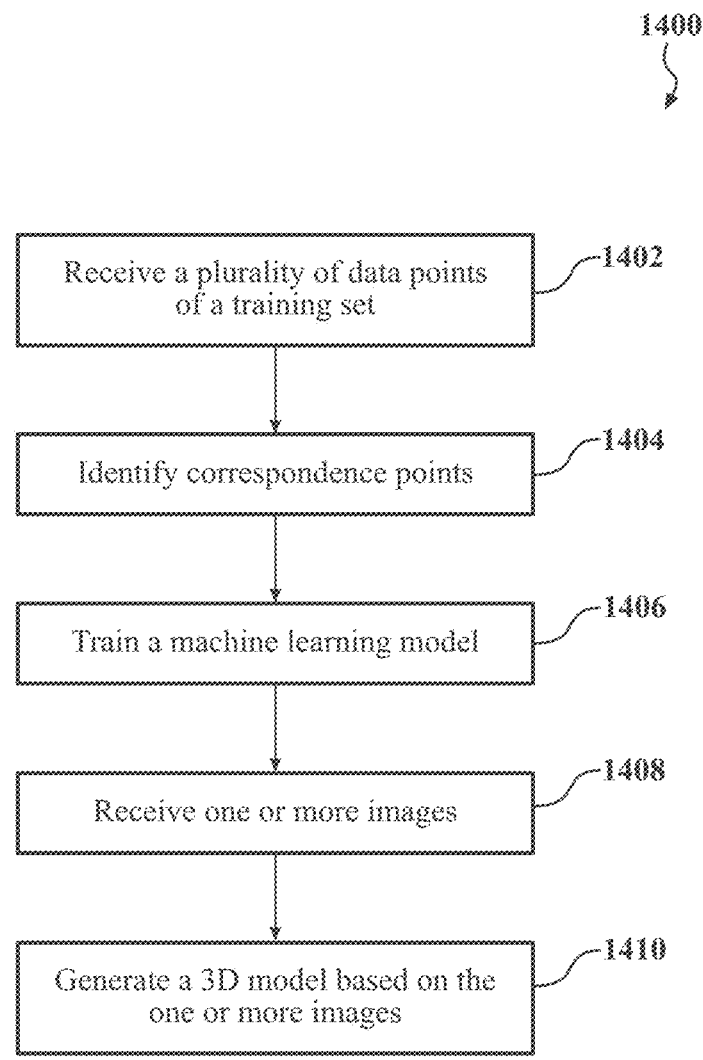
FIG. 14 is an illustration of a method of generating a 3D model from one or more 2D user images, according to an illustrative embodiment.

Referring now to FIG. 14, a flow chart showing an example method 1400 of generating a 3D model from one or more 2D user images is shown, according to an illustrative embodiment. The method 1400 may be performed by one or more of the components described above with reference to FIG. 8. As a brief overview, at step 1402, a model training system 802 receives a plurality of data packets 814 of a training set 812. At step 1404, the model training system 802 identifies correlation points 816. At step 1406, the model training system 802 trains a machine learning model 822. At step 1408, a model generation system 824 receives one or more images 828. At step 1410, the model generation system 824 generates a 3D model 830 based on the one or more images 828.

At step 1402, a model training system 802 receives a plurality of data packets 814 of a training set 812. In some embodiments, each data packet 814 includes data corresponding to one or more training images 804 of a first dental arch of a first user and a three-dimensional (3D) training model 806 of the first dental arch of the first user. As such, the data packets 814 may correspond to a respective dental arch, and may include data corresponding to training images 804 of the dental arch and a 3D training model 806 of the dental arch. In some embodiments, the data ingestion engine 808 may receive the training images 804 and 3D training model 806 from a data source as described above with respect to FIG. 9. The data ingestion engine 808 may generate the data packets 814 of the training set 812 from the training images 804 and the 3D training model 806 for training the machine learning model 822, as described in greater detail below.

In some embodiments, the model training system 802 may apply a mask to one or more teeth represented in the training images 804. In some instances, the model training system 802 may apply a bounding box around the dental arch represented in the training images 804, and apply a mask to one or more of the teeth of the dental arch. In some implementations, the model training system 802 may apply the mask to individual teeth of the dental arch. In some implementations, the model training system 802 may apply the mask to the set of the teeth of the dental arch (as shown in FIG. 11 and described in greater detail above). Hence, the masks may be applied on a tooth-by-tooth basis, or the masks may be applied to the each of the teeth of the dental arch shown in the training images 804.

In some embodiments, the model training system 802 may calculate an estimated pose of the dental arch in the training images 804. The model training system 802 may calculate the estimated pose by performing a KRT analysis (e.g., using metadata corresponding to the training images 804) as described above with respect to FIG. 9 and FIG. 12. The model training system 802 may use the estimated pose for modifying a pose of the 3D training model 806. For example, the model training system 802 may adjust, modify, or otherwise change the pose of the 3D training model 806 to match (or substantially match) the estimated pose of the dental arch shown in the training images 804. The model training system 802 may modify the pose of the 3D training model 806 to match the estimated pose in the training images 804 for displaying on a computing device used for selecting correlation points 816, as described in greater detail below.

In some embodiments, the model training system 802 may generate the 3D training model 806 from an initial 3D training model (as shown in FIG. 13 and described above). For example, the model training system 802 may receive an initial 3D training model that includes a 3D representation of an upper dental arch of a user and a 3D representation of a lower dental arch of the user. Each of the 3D representations may include representations of teeth and gingiva (e.g., a 3D representation of upper teeth and a 3D representation of upper gingiva, and a 3D representation of lower teeth and a 3D representation of lower gingiva). The model training system 802 may generate the 3D training model from the initial 3D training model by separating the 3D representation of the upper dental arch from the 3D representation of the lower dental arch, and removing the 3D representation of the gingiva from the separated 3D representation of teeth. As such, the 3D training model may include the 3D representation of the plurality of teeth for the dental arch. In some implementations, the model training system 802 may voxelize the 3D training model (e.g., voxelize at least the teeth represented in the 3D training model).

At step 1404, the model training system 802 identifies correlation points 816. In some embodiments, the model training system 802 may identify a plurality of correlation points 816 between the one or more training images 804 and the 3D training model 806 of a respective dental arch for a data packet 814 of the training set 812. In some embodiments, the model training system 802 may identify the correlation points 816 by receiving a selection of the correlation points 816 from a computing device 810. The computing device 810 may display the training images 804 and the 3D training model 806. A user of the computing device 810 may select a first point on the training image 804. The user may then select a second point on the 3D training model 806 that corresponds to the first point on the training image 804. As such, the first and second points may together form a correlation point. In some embodiments, the model training system 802 may automatically select the correlation points between the training images 804 and the 3D training model 806.

At step 1406, the model training system 802 trains a machine learning model 822. In some embodiments, the model training system 802 may train the machine learning model 822 using the plurality of correlation points 816 for the plurality of data packets 814 of the training set 812. In some embodiments, the model training system 802 may train the machine learning model 822 by transmitting, sending, or otherwise providing the correlation points 816, training images 804, and 3D training model 806 (which collectively form the training set 812) to a machine learning training engine 820 which trains the machine learning model 822. The machine learning training engine 820 may use the training set 812 as an input for training one or more weights of a neural network corresponding to the machine learning model 822. In some embodiments, the machine learning training engine 820 may train the machine learning model 822 to detect, determine, or otherwise predict a color of the 3D model. In such embodiments, the training set 812 may include color data (e.g., the training images 804 and/or the 3D training model 806 may include color data).

In some embodiments, the model training system 802 may receive one or more configuration parameters for generating the machine learning model 822. The model training system 802 may receive the configuration parameters from a computing device (such as computing device 810). The configuration parameters may include, for example, a number of training iterations that the machine learning training engine 820 is to perform using the training set 812 for training the machine learning model 822. The model training system 802 may transmit the configuration parameters along with the training set 812 to the machine learning training engine 820, to cause the machine learning training engine 820 to perform the number of iterations on the training set to generate the trained machine learning model 822.

At step 1408, a model generation system 824 receives one or more images 828. In some embodiments, the model generation system 824 receives one or more images 828 of a dental arch of a patient. The model generation system 824 may receive the images 828 from a user device 826. The user device 826 may transmit, send, or otherwise provide the images 828 to the model generation system 824 (e.g., by uploading the images 828 to a portal associated with the model generation system 824, by transmitting the images 828 to an address associated with the model generation system 824, etc.). The images 828 may represent a portion of a dental arch of the patient. In some embodiments, the model generation system 824 may receive a plurality of images 828 of the dental arch. The plurality of images 828 may each depict or otherwise represent a portion of the dental arch from a different perspective such that the plurality of images 828 together represent the dental arch (e.g., in its entirety).

At step 1410, the model generation system 824 generates a 3D model 830 based on the one or more images 828. In some embodiments, the model generation system 824 may generate the 3D model of the dental arch of the patient by applying the one or more images of the second dental arch to the machine learning model (e.g., generated at step 1406). The model generation system 824 may provide the one or more images received at step 1408 to the machine learning model as an input. The machine learning model may be trained to generate the 3D model 830 based on the images received as an input and corresponding weights of the neural network for the machine learning model. As such, the machine learning model may generate the 3D model 830 as an output based on the input images 828 and the corresponding weights of the neural network of the machine learning model. In some embodiments, such as where the machine learning model is trained to predict a color of the 3D model 830, the machine learning model may generate the 3D model 830 to include color data based on the input images 828. The 3D model 830 may be generated as a Standard Triangle Language (STL) file for stereolithography, a mesh, or other 3D representation of the dental arch of the patient represented in the image(s). The STL file can describe only a triangulated surface geometry of the 3D model 830 without any representation of color, texture or other attribute.

In some embodiments, the method 1400 may further include manufacturing a dental aligner based on the 3D model where the dental aligner is specific to the user and configured to reposition one or more teeth of the user. Manufacturing the dental aligner may be similar to step 608 of FIG. 6 described above.

In some embodiments, the method 1400 may further include tracking a progress of repositioning one or more teeth of a patient via one or more dental aligners from an initial position prior to treatment to a final position following treatment. As described above, a patient may be treated according to treatment plan including a series of stages of movement (and corresponding dental aligners used at a respective stage to implement movement of the teeth in accordance with the treatment plan). The model generation system 824 may generate the 3D model 830 based on images 828 captured following one or more stages of treatment (or following treatment via dental aligners). The user may capture images 828 responsive to one or more prompts to capture images at various intervals of treatment. For example, the patient may be prompted to upload images 828 at various intervals (such as daily, weekly, every two weeks, following completion of a stage of treatment, every six months or year following treatment via dental aligners, whenever the patient requests to check their progress, etc.). The 3D model 830 generated by the model generation system 824 may then be compared to the 3D model included in a patient file corresponding to the stage of treatment to determine whether the patient's teeth moved according to the treatment plan (e.g., as expected) for the patient. The patient file may include a 3D model for each stage of treatment (e.g., an initial 3D model corresponding to an initial stage of treatment, one or more intermediate 3D models corresponding to intermediate stages of treatment, and a final 3D model corresponding to the final stage of treatment). The 3D model 830 generated by the model generation system 824 may be compared to the 3D models from the patient file. For example, where the 3D model 830 generated from the user images 828 matches (or substantially matches) the 3D model included in the patient file corresponding to the particular stage of the treatment plan, the patient may be determined to be progressing in accordance with the treatment plan, since the patient's teeth are moving according to the progression defined in the treatment plan from their initial position prior to treatment, to one or more intermediate positions, and to a final position following treatment. However, where the 3D model 830 generated from the user images 828 does not match (or substantially match) the 3D model included in the patient file corresponding to the particular stage of the treatment plan, the patient may be determined to not be progressing in accordance with the treatment plan. When the patient is determined to not be progressing in accordance with a treatment plan, the patient file may be flagged for a mid-course correction of treatment. For example, when a patient is determined to not be progressing according to the treatment plan, the patient file may be flagged to generate a new treatment plan from the patient's current teeth positions (and, correspondingly, new dental aligners according to the new treatment plan). As another example, when the patient is determined to not be progressing according to the treatment plan, the patient may be prompted to skip one or more aligners (e.g., to advance to another stage of treatment where the patient is progressing faster than expected or predicted under the treatment plan), use a particular aligner out of order, such that the patient's teeth move back on course according to the treatment plan.

In some embodiments, the method 1400 may further include displaying the 3D model 830 on a user interface at the user device 826. In other words, the 3D model 830 may be rendered on a user interface back to a user via the user device 826. For example, the model generation system 824 may transmit, send, or otherwise provide the 3D model 830 to the user device 826 for rendering to the user. In some embodiments, the model generation system 824 may generate a user interface for displaying at the user device 826. The user interface may include, for example, the 3D model 830 generated based on the user images 828. In some embodiments, the user interface may include another 3D model. For example, the user interface may include the 3D model 830 generated based on the user images 828 and an expected 3D model (such as the 3D model from the patient file corresponding to the current stage of treatment). Such embodiment may allow the user to track their progress in comparison to the target 3D model corresponding to the treatment plan. As another example, the user interface may include the 3D model 830 and a prior (and/or subsequent) 3D model. The prior 3D model may be the 3D model from the patient file corresponding to a prior stage of the treatment plan. The prior 3D model may be a 3D model generated from a previous user image 828. The subsequent 3D model may be the 3D model from the patient file corresponding to a subsequent stage of the treatment plan. The user may view the prior 3D model, the current 3D model 830, and/or a subsequent 3D model to show a progress of the patient's treatment.

Figure 15:
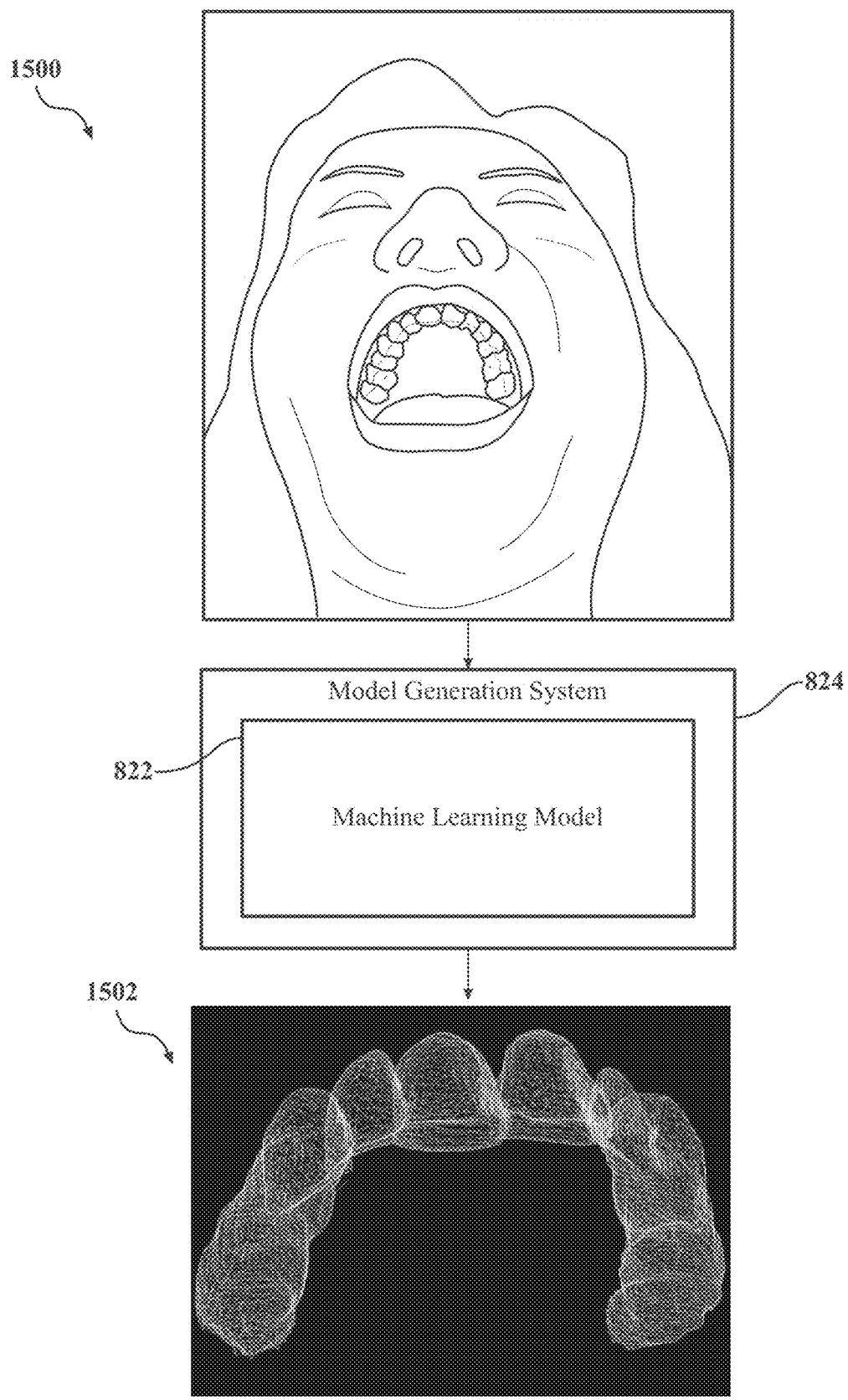
FIG. 15 is an illustration of a use case diagram of the system of FIG. 8, according to an illustrative embodiment.

Referring now to FIG. 15, a use case diagram of the system 800 of FIG. 8 is shown, according to an illustrative embodiment. As shown in FIG. 15, a user may upload one or more images (such as image 1500) that include a representation of the user's teeth. In some embodiments, the user may capture images from different perspectives, such as those shown in FIG. 2A-FIG. 2C. In some embodiments, the user may capture images of their own teeth. In some embodiments, a different person may capture images of the user's teeth (e.g., from the user's device or from a different device). The user may provide the image 1500 to the model generation system 824. The model generation system 824 may apply the image 1500 to the trained machine learning model 822 (e.g., as an input) to generate a 3D model 1502 based on the image 1500. Accordingly, the machine learning model 822 is trained to use an image 1500 received from a user to generate a 3D model 1502.

In some embodiments, some of the results (e.g., 3D models) generated via the machine learning model 822 may be used for refining the machine learning model 822 and/or other processes for generating subsequent models. For example, a user performing a quality review or check of the 3D models generated via the machine learning model 822 may further refine parameters (such as the configuration parameters) based on the outputs of the machine learning models.

Figure 16:
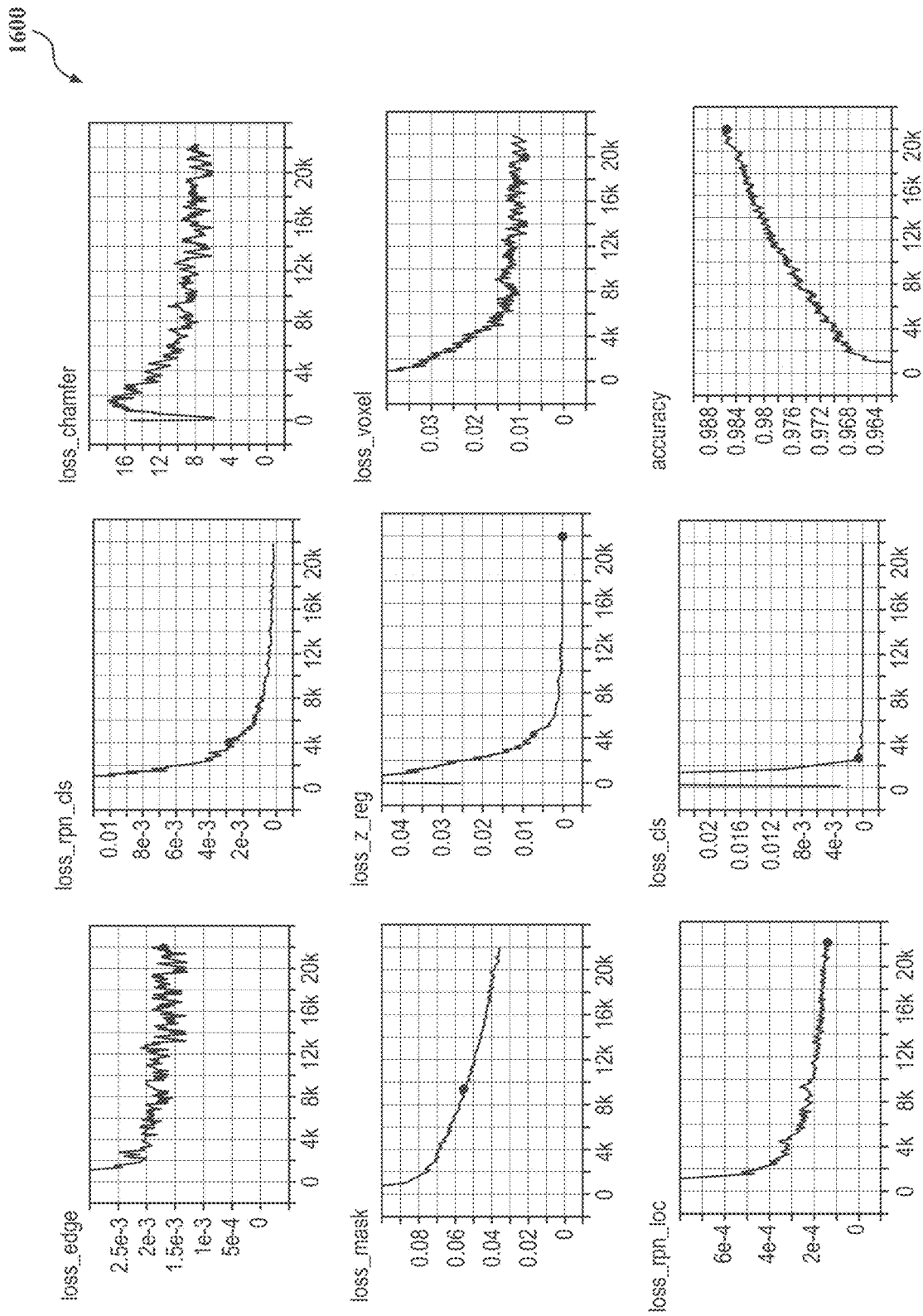
FIG. 16 are illustrations of a series of graphs corresponding to training of a machine learning model of the system of FIG. 8, according to an illustrative embodiment.
Figure 17:
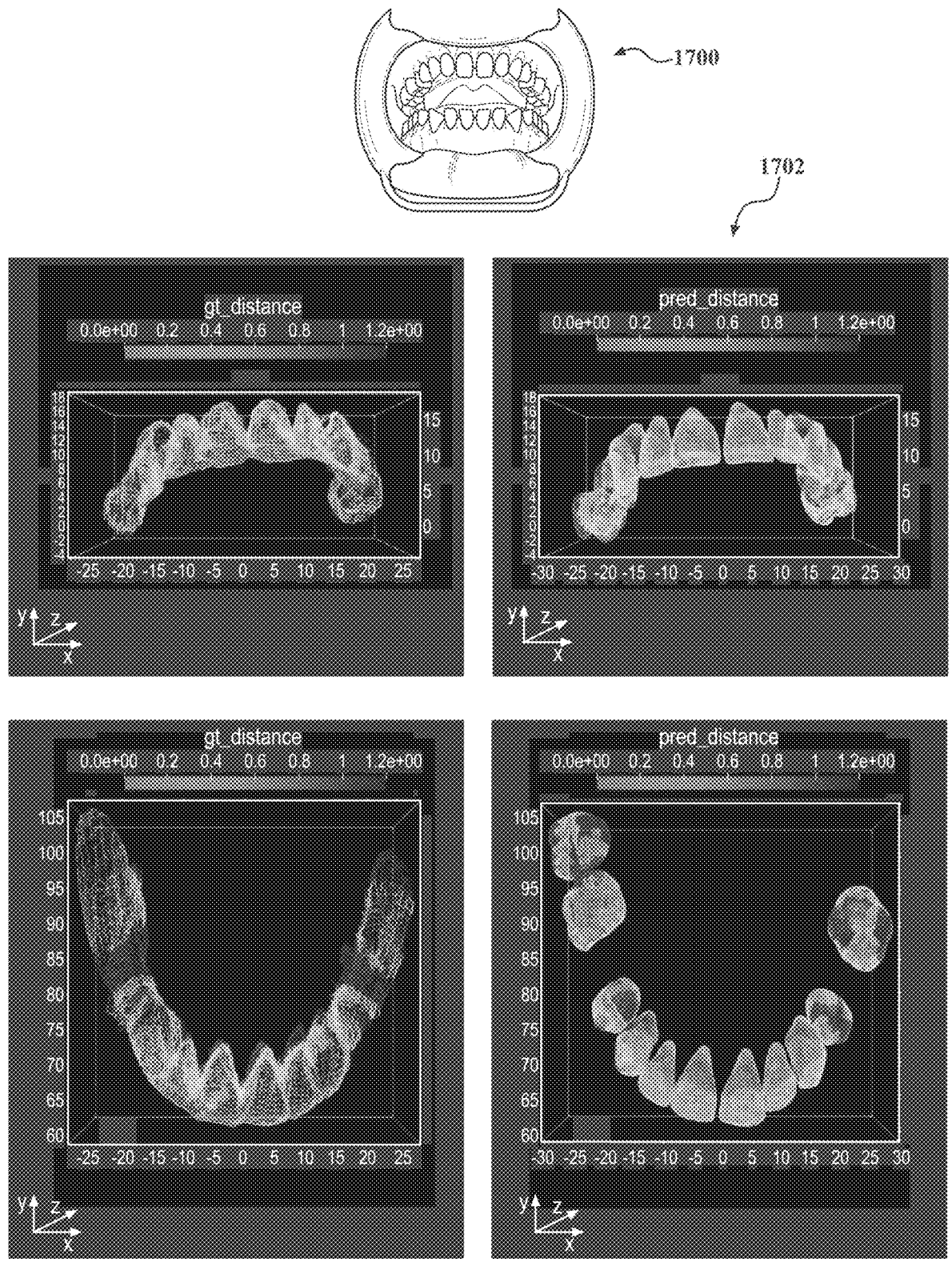
FIG. 17 are illustrations of a series of model evaluation interfaces corresponding to a model generated by the machine learning model of the system of FIG. 8, according to an illustrative embodiment.

Referring now to FIGS. 16 and 17, a series of graphs 1600 corresponding to training of the machine learning model 822 is shown in FIG. 16, and a series of model evaluation interfaces 1702 showing a model generated by the machine learning model 822 based on an image 1700 from a user is shown in FIG. 17. Each of the graphs 1600 shown in FIG. 16 may be representative of metrics of each model used to train the machine learning model 822. Such metrics may include or correspond to configuration parameters 818 that are used for training the machine learning model 822. Correspondingly, a person performing quality control of the machine learning model 822 may view the graphs 1600 shown in FIG. 16 and interfaces 1702 to modify various configuration parameters 818 for updating or otherwise refining the training of the machine learning model 822. Various examples of configuration parameters 818 which may be represented in graphs 1600 include loss edge, loss region proposal network (RPN), classification (CLS), loss chamfer, loss mask, loss z regression (REG), loss voxel, loss RPN local, loss classification, accuracy, etc. Additional examples of configuration parameters 181 which may be represented in graphs 1600 include data time, estimated time of arrival (ETA) in seconds, fast regions with convolutional neural network (R-CNN), loss normal, mask R-CNN, region of interest (ROI) head, RPN, time, total loss, and voxel R-CNN. While these configuration parameters 818 are described, it is noted that the machine learning model 822 may be trained or configured to leverage various combinations of these (and other) configuration parameters 818. The graphs 1600 and interfaces 1702 may be rendered on the computing device 810. A technician viewing the graphs 1600 and interfaces 1702 may adjust, tune, or otherwise revise one or more of the configuration parameters 818 to modify the machine learning model 822. In some embodiments, the computing device 810 may automatically adjust, tune, or otherwise revise the configuration parameters 818, or may make recommendations of changes to configuration parameters 818 for acceptance by the technician. Such embodiments may provide for a more accurate tuning of the configuration parameters 818 for training the machine learning model 822.

Figure 18:
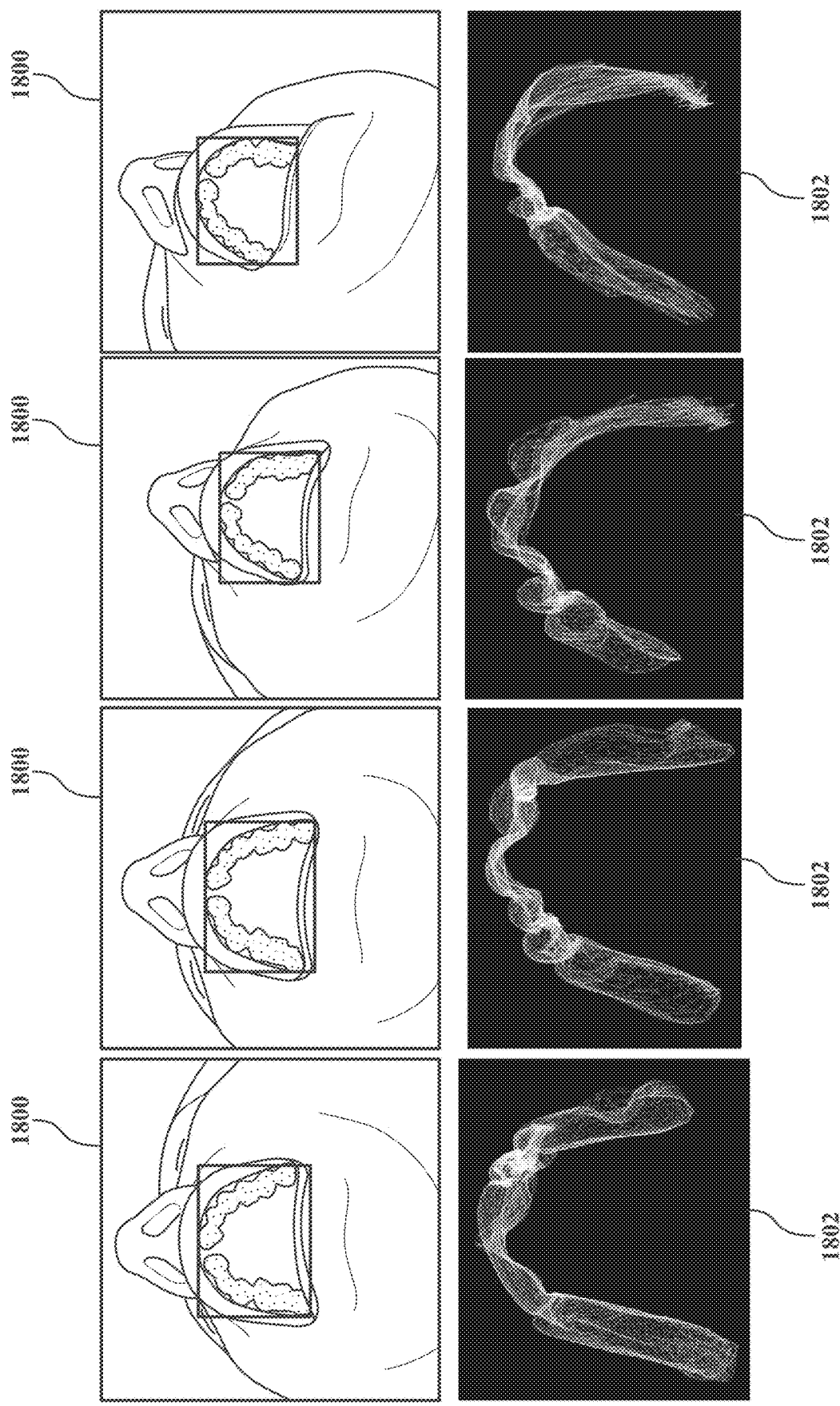
FIG. 18 is an illustration of a series of images of a user and a corresponding series of 3D models generated using the machine learning model of the system of FIG. 8, according to an illustrative embodiment.

Referring now to FIG. 18, a series of images 1800 of a user and a corresponding series of 3D models 1802 which are generated using the machine learning model 822 are shown. As shown in FIG. 18, a dental arch of the user is represented in the images 1800. The models 1802 shown in FIG. 18 are separate 3D models which are generated from the plurality of images 1800 by the machine learning model 822. As such, the machine learning model 822 may generate the plurality of 3D models 1802 from a plurality of images 1800 of the user's dental arch (e.g., from different perspectives). In some embodiments, the model generation system 824 may generate a merged 3D model from the plurality of 3D models 1802. As described above, the model generation system 824 may combine, fuse, or otherwise merge the plurality of 3D models 1802 to form a merged 3D model of the dental arch. The 3D models may be merged as described above to form the merged model 1802. As shown in FIG. 18, through the implementations and embodiments described above, the machine learning model 822 may generate 3D models from different views, which may be merged and together model an entire dental arch, including occlusal regions, which may be difficult to model.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be X, Y, or Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, flash memory, hard disk storage) for storing data and/or computer code for completing or facilitating the various processes, layers and circuits described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data, which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the systems and methods shown in the various exemplary embodiments are illustrative only. Additionally, any element disclosed in one embodiment may be incorporated or utilized with any other embodiment disclosed herein.

What is claimed is:

1. A system comprising:
    one or more processors coupled to a non-transitory memory, the one or more processors configured to:
        generate, using a training set comprising one or more two-dimensional (2D) training images of a dental arch and a three-dimensional (3D) dental arch model, a machine-learning model configured to generate 3D models of dental arches from 2D images of the dental arches, wherein generating the machine-learning model comprises:
            (i) determining a number of iterations for training the machine-learning model using the training set; and
            (ii) training, based on the number of iterations, parameters of the machine-learning model using the training set;
        receive one or more 2D images of a dental arch of a user obtained by a user device of the user; and
        execute the machine-learning model using the one or more 2D images as input to generate a 3D model of the dental arch of the user.

2. The system of claim 1, wherein the machine-learning model is an optimization model.

3. The system of claim 1, wherein the 2D training images include the one or more 2D images of the dental arch of the user obtained by the user device of the user.

4. The system of claim 1, wherein the 3D dental arch model is a template 3D dental arch model based on data from a data source that stores a plurality of images and 3D models.

5. The system of claim 1, wherein the 3D dental arch model is generated using a prior 3D model associated with the user.

6. The system of claim 1, wherein the one or more processors are further configured to iteratively estimate a pose of the 3D dental arch model based on the one or more two-dimensional training images.

7. The system of claim 1, wherein the one or more processors are further configured to generate the machine-learning model by performing operations comprising:
    calculating one or more correlation points between the one or more 2D training images and the 3D dental arch model; and generating the machine-learning model further based on the one or more correlation points.

8. The system of claim 1, wherein the one or more processors are further configured to estimate respective positions of one or more teeth of the 3D model based on the one or more 2D images.

9. The system of claim 1, wherein the one or more processors are further configured to generate the 3D dental arch model by removing a 3D representation of at least a portion of a gingiva from an initial 3D dental arch model.

10. The system of claim 1, wherein the one or more processors are further configured to:
generate a user interface that renders the 3D model of the dental arch of the user at the user device; and
transmit, to the user device, the user interface for presentation.

11. The system of claim 1, wherein the 3D dental arch model includes color data, and the one or more processors are further configured to train the machine-learning model to generate color corresponding to the dental arch of the user.

12. The system of claim 1, wherein the one or more processors are further configured to transmit the 3D model of the dental arch of the user to a manufacturing system configured to manufacture a dental aligner based on the 3D model.

13. A method comprising:
generating, by one or more processors coupled to a non-transitory memory, using a training set comprising one or more two-dimensional (2D) training images of a dental arch and a three-dimensional (3D) dental arch model of a dental arch, a machine-learning model configured to generate 3D models of dental arches from 2D images of the dental arches, wherein generating the machine-learning model comprises:
(i) determining a number of iterations for training the machine-learning model using the training set; and
(ii) training, based on the number of iterations, parameters of the machine-learning model using the training set;
receiving, by the one or more processors, one or more 2D images of a dental arch of a user obtained by a user device of the user; and
executing, by the one or more processors, the machine-learning model using the one or more 2D images as input to generate a 3D model of the dental arch of the user.

14. The method of claim 13, wherein the machine-learning model is an optimization model.

15. The method of claim 13, wherein the 2D training images include the one or more 2D images of the dental arch of the user obtained by the user device of the user.

16. The method of claim 13, wherein the 3D dental arch model is a template 3D dental arch model based on data from a data source that stores a plurality of images and 3D models.

17. The method of claim 13, wherein the 3D dental arch model is generated using a prior 3D model associated with the user.

18. The method of claim 13, further comprising iteratively estimating, by the one or more processors, a pose of the 3D dental arch model based on the one or more two-dimensional training images.

19. The method of claim 13, wherein generating the machine-learning model comprises:
calculating, by the one or more processors, one or more correlation points between the one or more 2D training images and the 3D dental arch model; and
generating, by the one or more processors, the machine-learning model further based on the one or more correlation points.

20. The method of claim 13, further comprising estimating, by the one or more processors, respective positions of one or more teeth of the 3D model based on the one or more 2D images.

21. The method of claim 13, further comprising generating, by the one or more processors, the 3D dental arch model by removing a 3D representation of at least a portion of a gingiva from an initial 3D dental arch model.

22. The method of claim 13, further comprising:
generating, by the one or more processors, a user interface that renders the 3D model of the dental arch of the user at the user device; and
transmitting, by the one or more processors, to the user device, the user interface for presentation.

23. The method of claim 13, wherein the 3D dental arch model includes color data, and the method comprises training, by the one or more processors, the machine-learning model to generate color corresponding to the dental arch of the user.

24. The method of claim 13, further comprising transmitting, by the one or more processors, the 3D model of the dental arch of the user to a manufacturing system configured to manufacture a dental aligner based on the 3D model.

25. A non-transitory computer readable medium storing instructions that, when executed by one or more processors, cause the one or more processors to:
generate, using a training set comprising one or more two-dimensional (2D) training images of a dental arch and a three-dimensional (3D) dental arch model of a dental arch, a machine-learning model configured to generate 3D models of dental arches from 2D images of the dental arches, wherein generating the machine-learning model comprises:
(i) determining a number of iterations for training the machine-learning model using the training set; and
(ii) training, based on the number of iterations, parameters of the machine-learning model using the training set;
receive one or more 2D images of a dental arch of a user obtained by a user device of the user; and
execute the machine-learning model using the one or more 2D images as input to generate a 3D model of the dental arch of the user.

26. The non-transitory computer readable medium of claim 25, wherein the machine-learning model is an optimization model.

27. The non-transitory computer readable medium of claim 25, wherein the 2D training images include the one or more 2D images of the dental arch of the user obtained by the user device of the user.

28. The non-transitory computer readable medium of claim 25, wherein the 3D dental arch model is a template 3D dental arch model based on data from a data source that stores a plurality of images and 3D models.

29. The non-transitory computer readable medium of claim 25, wherein the 3D dental arch model is generated using a prior 3D model associated with the user.

30. The non-transitory computer readable medium of claim 25, wherein the user is a patient, wherein the patient is a candidate for or currently undergoing dental aligner treatment to reposition one or more teeth of the patient, and wherein the user device is a smartphone of the patient.

* * * * *